US012279092B2

(12) United States Patent
Zhang et al.

(10) Patent No.: US 12,279,092 B2
(45) Date of Patent: *Apr. 15, 2025

(54) INTERACTIVE SYSTEM FOR HEARING DEVICES

(71) Applicant: Starkey Laboratories, Inc., Eden Prairie, MN (US)

(72) Inventors: Tao Zhang, Eden Prairie, MN (US); Eric Durant, Milwaukee, WI (US); Dean G. Meyer, Mound, MN (US); Martin McKinney, Minneapolis, MN (US); Matthew D. Kleffner, Eden Prairie, MN (US); Dominic Perz, Bloomington, MN (US); Karrie Recker, Edina, MN (US)

(73) Assignee: Starkey Laboratories, Inc., Eden Prairie, MN (US)

( * ) Notice: Subject to any disclaimer, the term of this patent is extended or adjusted under 35 U.S.C. 154(b) by 179 days.

This patent is subject to a terminal disclaimer.

(21) Appl. No.: 17/804,757

(22) Filed: May 31, 2022

(65) Prior Publication Data

US 2022/0295194 A1  Sep. 15, 2022

Related U.S. Application Data

(63) Continuation of application No. 16/192,333, filed on Nov. 15, 2018, now Pat. No. 11,412,333.

(Continued)

(51) Int. Cl.
*H04R 25/00* (2006.01)
*G06F 3/16* (2006.01)
(Continued)

(52) U.S. Cl.
CPC .......... *H04R 25/505* (2013.01); *G06F 3/165* (2013.01); *G10L 15/063* (2013.01);
(Continued)

(58) Field of Classification Search
CPC .... H04R 25/30; H04R 25/407; H04R 25/552; H04R 25/554; H04R 25/70; H04R 2225/41; G06F 3/165
See application file for complete search history.

(56) References Cited

U.S. PATENT DOCUMENTS 5,636,285 A    6/1997   Sauer
5,721,783 A    2/1998   Anderson
(Continued)

FOREIGN PATENT DOCUMENTS

EP    0830802 B1    3/2008
EP    2521377 A1    7/2012
(Continued)

OTHER PUBLICATIONS

Communication pursuant to Article 94(3) EPC from counterpart European Application No. 18814755.7 dated Jan. 21, 2022, 10 pp.

(Continued)

*Primary Examiner* — Paras D Shah
*Assistant Examiner* — Oluwadamilola M Ogunbiyi
(74) *Attorney, Agent, or Firm* — Shumaker & Sieffert, P.A.

(57) ABSTRACT

In an audio signal, one or more processing circuits recognize spoken content in a user's own speech signal using speech recognition and natural language understanding. The spoken content describes a listening difficulty of the user. The one or more processing circuits generate, based on the spoken content, one or more actions for hearing devices and feedback for the user. The one or more actions attempt to resolve the listening difficulty. Additionally, the one or more processing circuits convert the user feedback to verbal feedback using speech synthesis and transmit the one or more actions and the verbal feedback to the hearing devices via a body-worn device. The hearing devices are configured to perform (Continued)

the one or more actions and play back the verbal feedback to the user.

16 Claims, 7 Drawing Sheets

Related U.S. Application Data

(60) Provisional application No. 62/586,561, filed on Nov. 15, 2017.

(51) Int. Cl.
*G10L 15/06* (2013.01)
*G10L 15/22* (2006.01)

(52) U.S. Cl.
CPC ........... *H04R 25/407* (2013.01); *H04R 25/70* (2013.01); *G10L 2015/225* (2013.01); *H04R 25/30* (2013.01); *H04R 25/552* (2013.01); *H04R 25/554* (2013.01); *H04R 2225/39* (2013.01); *H04R 2225/41* (2013.01); *H04R 2225/43* (2013.01); *H04R 2225/55* (2013.01)

(56) References Cited

U.S. PATENT DOCUMENTS

| | | | |
|---|---|---|---|
| 9,092,802 B1 | 7/2015 | Akella | |
| 9,344,815 B2 | 5/2016 | Selig et al. | |
| 2002/0150269 A1 | 10/2002 | Ludvigsen | |
| 2003/0133578 A1* | 7/2003 | Durant | G06N 3/126 381/60 |
| 2005/0059904 A1 | 3/2005 | Chalupper et al. | |
| 2005/0105750 A1 | 5/2005 | Frohlich et al. | |
| 2006/0222194 A1 | 10/2006 | Bramslow et al. | |
| 2008/0262849 A1 | 10/2008 | Buck et al. | |
| 2010/0136905 A1 | 6/2010 | Kristiansen | |
| 2011/0004468 A1 | 1/2011 | Fusakawa et al. | |
| 2011/0188664 A1 | 8/2011 | Morikawa et al. | |
| 2011/0200215 A1 | 8/2011 | Apfel et al. | |
| 2011/0249844 A1* | 10/2011 | Merks | H04R 25/505 381/317 |
| 2011/0261983 A1 | 10/2011 | Claussen et al. | |
| 2011/0268301 A1 | 11/2011 | Nielsen et al. | |
| 2012/0014553 A1 | 1/2012 | Bonanno | |
| 2013/0142367 A1* | 6/2013 | Berry | G16H 40/40 381/315 |
| 2013/0177188 A1 | 7/2013 | Apfel et al. | |
| 2013/0243209 A1* | 9/2013 | Zurbruegg | H04R 25/70 381/60 |
| 2013/0243227 A1* | 9/2013 | Kinsbergen | H04M 1/6016 381/314 |
| 2013/0304758 A1 | 11/2013 | Gruber et al. | |
| 2014/0023216 A1 | 1/2014 | Solum et al. | |
| 2014/0080407 A1 | 3/2014 | Jang | |
| 2014/0254827 A1 | 9/2014 | Bailey | |
| 2014/0314261 A1 | 10/2014 | Selig et al. | |
| 2015/0010160 A1 | 1/2015 | Udesen | |
| 2015/0030162 A1 | 1/2015 | Luo et al. | |
| 2015/0036856 A1 | 2/2015 | Pruthi et al. | |
| 2015/0043762 A1 | 2/2015 | Kim et al. | |
| 2015/0088500 A1 | 3/2015 | Conliffe | |
| 2015/0125016 A1 | 5/2015 | De Vries et al. | |
| 2015/0172831 A1 | 6/2015 | Dittberner et al. | |
| 2015/0172837 A1 | 6/2015 | Martinez Azkorra | |
| 2015/0245150 A1* | 8/2015 | Jepsen | H04R 25/50 381/314 |
| 2015/0312685 A1 | 10/2015 | Huettinger et al. | |
| 2015/0381609 A1 | 12/2015 | Dadu et al. | |
| 2016/0007128 A1* | 1/2016 | Roeck | H04R 25/554 381/60 |
| 2016/0066104 A1 | 3/2016 | Minnaar | |
| 2016/0127842 A1* | 5/2016 | Perels | H04R 25/305 381/23.1 |
| 2016/0162254 A1 | 6/2016 | Benattar | |
| 2016/0164949 A1 | 6/2016 | Grimstrup et al. | |
| 2016/0302015 A1 | 10/2016 | El Guindi et al. | |
| 2016/0337769 A1* | 11/2016 | Siddhartha | H04R 25/70 |
| 2016/0345111 A1* | 11/2016 | Wilson | A61B 5/12 |
| 2016/0360326 A1 | 12/2016 | Bergmann et al. | |
| 2017/0286918 A1 | 1/2017 | Westermann | |
| 2017/0048609 A1 | 2/2017 | Schnell et al. | |
| 2017/0064463 A1 | 3/2017 | Greenberger | |
| 2017/0201839 A1 | 7/2017 | Manchester | |
| 2017/0206888 A1 | 7/2017 | Engelke et al. | |
| 2017/0256272 A1 | 9/2017 | Kamkar Parsi et al. | |
| 2017/0257472 A1 | 9/2017 | Gehring et al. | |
| 2017/0257713 A1 | 9/2017 | Westermann et al. | |
| 2017/0311092 A1 | 10/2017 | Secall et al. | |
| 2017/0311103 A1 | 10/2017 | Webster et al. | |
| 2017/0347205 A1 | 11/2017 | Aschoff | |
| 2018/0146307 A1 | 1/2018 | Petersen | |
| 2018/0054683 A1 | 2/2018 | Pedersen et al. | |
| 2018/0063618 A1 | 3/2018 | Boesen | |
| 2018/0108370 A1 | 4/2018 | Dow et al. | |
| 2018/0109889 A1 | 4/2018 | Kang et al. | |
| 2018/0146310 A1 | 5/2018 | Bazzoni | |
| 2018/0176696 A1 | 6/2018 | Voigt Pedersen | |
| 2018/0213339 A1 | 7/2018 | Shah et al. | |
| 2018/0220241 A1 | 8/2018 | Naumann | |
| 2018/0255406 A1 | 9/2018 | Sorensen et al. | |
| 2018/0275956 A1 | 9/2018 | Reed et al. | |
| 2018/0288535 A1 | 10/2018 | De Vries et al. | |
| 2018/0324535 A1* | 11/2018 | Boesen | H04R 25/70 |
| 2019/0034791 A1 | 1/2019 | Busch et al. | |
| 2019/0057187 A1 | 2/2019 | Head et al. | |
| 2019/0090055 A1 | 3/2019 | Jost et al. | |
| 2019/0090073 A1* | 3/2019 | Wendt | A61B 5/125 |
| 2019/0102142 A1 | 4/2019 | Christiansen et al. | |
| 2019/0110135 A1 | 4/2019 | Jensen et al. | |
| 2019/0121532 A1 | 4/2019 | Strader et al. | |
| 2020/0143701 A1 | 5/2020 | Letzt et al. | |
| 2020/0242685 A1 | 7/2020 | Dollens | |
| 2020/0286599 A1 | 9/2020 | Ramarajan et al. | |

FOREIGN PATENT DOCUMENTS

| | | | | |
|---|---|---|---|---|
| EP | 2375786 B1 | 7/2013 | | |
| EP | 2651149 B1 | 5/2017 | | |
| EP | 3288293 A1 * | 2/2018 | ........... | H04R 25/505 |
| WO | 1997001314 A1 | 1/1997 | | |
| WO | 2011095229 A1 | 8/2011 | | |
| WO | 2016/209924 A1 | 12/2016 | | |

OTHER PUBLICATIONS

International Preliminary Report on Patentability from International Application No. PCT/US2018/061322, mailed May 29, 2020, 10 pp.
International Search Report and Written Opinion of International Application No. PCT/US2018/061322, mailed Nov. 15, 2018, 15 pp.
Response to Communication pursuant to Article 94(3) EPC dated Jan. 21, 2022, from counterpart European Application No. EP18814755.7 filed Jul. 11, 2022, 447 pp.
Notice of Intent to Grant and Text Intended to Grant from counterpart European Application No. 18814755.7 dated Feb. 7, 2024, 71 pp.
"Must-know Siri commands for Apple's wirelss AirPods," Apple Insider, https://appleinsider.com/articles/17/02/08/must-know-siri-commands-for-apples-wireless-airpods. Feb. 7, 2017, 3 pp.
"The Compression Handbook," Fourth Edition, Starkey Hearing Technologies, 2017, 48 pp. (Applicant points out, in accordance with MPEP 609.04(a), that the year of publication, 2017, is sufficiently earlier than the effective U.S. filing date, so that the particular month of publication is not in issue.).
Prosecution History from U.S. Appl. No. 16/192,333, dated Aug. 6, 2020 through May 12, 2022, 119 pp.

* cited by examiner

INTERACTIVE SYSTEM FOR HEARING DEVICES

This application is a continuation of U.S. patent application Ser. No. 16/192,333, filed Nov. 15, 2018, which claims the benefit of U.S. Provisional Patent Application No. 62/586,561, filed Nov. 15, 2017. The entire content of U.S. patent application Ser. No. 16/192,333 and U.S. Provisional Patent Application No. 62/586,561 is incorporated by reference.

TECHNICAL FIELD

This disclosure relates to hearing devices.

BACKGROUND

During and after fitting and fine-tuning processes, users of hearing devices want to make adjustments to their hearing devices. For example, users may want to change the volume level or memory settings of their hearing devices or other acoustic parameters of their hearing devices. Accordingly, many hearing devices include physical buttons and knobs that allow users to adjust one or more acoustic parameters. Because hearing devices are typically quite small, it may be difficult or impossible for hearing devices to include buttons or knobs for each of the adjustable acoustic parameters of the hearing devices. As a result, users may need to make an appointment to have a specialist adjust one or more of the acoustic parameters.

SUMMARY

This disclosure describes examples of a sound processing system for hearing device users. First, in some examples, the sound processing system may provide a speech interface for hearing devices of the sound processing system that allows a user to control and adjust the hearing devices in the field. Previously, it was challenging for a user to control and adjust the hearing devices in the field for various reasons, including decreased dexterity as result of aging or because the user's hands are occupied with other activities.

In this disclosure, the sound processing system detects (i.e., picks up) the user's own speech, enhances the user's own speech, and uses speech recognition and natural language understanding to allow the user to talk to the hearing devices in a natural and robust way. The user's intent, as determined by the sound processing system, may be fed into a cognitive engine to generate one or more actions and user feedback. The cognitive engine may generate the one or more actions and the user feedback by examining and learning from one or more of: a current state or setting of one or more hearing devices, an acoustic environment, a geographic environment, data regarding the user's preference, a hearing profile, experience, or patterns.

In some examples, the cognitive engine also learns and generalizes from information regarding other users, such as other users' hearing profiles, experiences and patterns, in order to produce even more effective action(s) and user feedback that is individualized. The hearing devices may apply the generated action(s) and provide the user feedback to the user using speech synthesis. The sound processing system may enable the user to interact with the hearing devices in a way that seems natural and intelligent to the user. Additionally, the sound processing system may help the user to troubleshoot and resolve listening difficulties on the spot by directly accessing and leveraging the existing knowledge and experience of fitting software. Furthermore, in some examples, the sound processing system provides the user an option to engage a hearing professional, such as an audiologist, directly using natural conversations. In some examples, the sound processing system allows the user to converse naturally with another user who speaks in a different language.

In one example, this disclosure describes a sound processing system comprising: a pair of hearing devices (e.g., implantable or non-implantable hearing devices); a body-worn device; and a cloud-based computing system, wherein: the cloud-based computing system comprises one or more processing circuits, volatile and non-volatile storage, and is configured to connect with multiple body-worn devices wirelessly at the same time, the body-worn device comprises one or more processing circuits, volatile and non-volatile storage, is configured to connect to either or both of the hearing devices wirelessly and is configured to connect with the cloud-based computing system wirelessly, each of the hearing devices comprises at least one microphone, one or more processing circuits, volatile and non-volatile storage, and a receiver, for each hearing device of the pair of hearing devices, the hearing device is configured to use the at least one microphone of the hearing device to detect a user's own speech signal, the body-worn device is configured to wirelessly receive the user's own speech signal from one or more of the hearing devices and to wirelessly transmit the user's own speech signal to the cloud-based computing system, the one or more processing circuits of the cloud-based computing system are configured to recognize spoken content in the user's own speech signal using speech recognition and natural language understanding, the spoken content describing a listening difficulty of the user; the one or more processing circuits of the cloud-based computing system perform activities of a cognitive engine that is configured to generate, based on the spoken content, one or more actions for the hearing devices and feedback for the user, wherein the one or more actions attempt to resolve the listening difficulty by making adjustments to one or more of the hearing devices; the one or more processing circuits of the cloud-based computing system are further configured to convert the feedback to verbal feedback using speech synthesis; and the cloud-based computing system is configured to transmit the one or more actions and the verbal feedback to the hearing devices via the body-worn device, and both of the hearing devices are configured to perform the one or more actions and play back the verbal feedback to the user using the receivers in a binaural way.

In another example, this disclosure describes a method for making adjustments to hearing devices of a sound processing system, the method comprising: wirelessly receiving, by a cloud-based computing system of the sound processing system, a user's own speech signal from a body-worn device of the sound processing system, wherein the user's own speech signal is detected by at least one microphone of the hearing devices, wherein at least one of the hearing devices wirelessly transmits the user's own speech signal to the body-worn device; recognizing, by the cloud-based computing system, spoken content in the user's own speech signal using speech recognition and natural language understanding, the spoken content describing a listening difficulty of the user; generating, by a cognitive engine implemented by the cloud-based computing system, based on the spoken content, one or more actions for the hearing devices and feedback for the user, wherein the one or more actions attempt to resolve the listening difficulty by making adjustments to one or more of the hearing devices; converting, by the cloud-based computing system, the feedback to verbal feedback using speech synthesis; transmitting, by the cloud-based computing system, the one or more actions and the verbal feedback to the hearing devices via the body-worn device.

In another example, this disclosure describes a non-transitory computer-readable data storage medium having instructions thereon that, when executed, cause a sound processing system to: wirelessly receive, by a cloud-based computing system of the sound processing system, a user's own speech signal from a body-worn device of the sound processing system, wherein the user's own speech signal is detected by at least one microphone of a pair of hearing devices, wherein at least one of the hearing devices wirelessly transmits the user's own speech signal to the body-worn device; recognize, by the cloud-based computing system, spoken content in the user's own speech signal using speech recognition and natural language understanding, the spoken content describing a listening difficulty of the user; generate, by a cognitive engine implemented by the cloud-based computing system, based on the spoken content, one or more actions for the hearing devices and feedback for the user, wherein the one or more actions attempt to resolve the listening difficulty by making adjustments to one or more of the hearing devices; convert, by the cloud-based computing system, the feedback to verbal feedback using speech synthesis; and transmit, by the cloud-based computing system, the one or more actions and the verbal feedback to the hearing devices via the body-worn device.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

Figure 1:
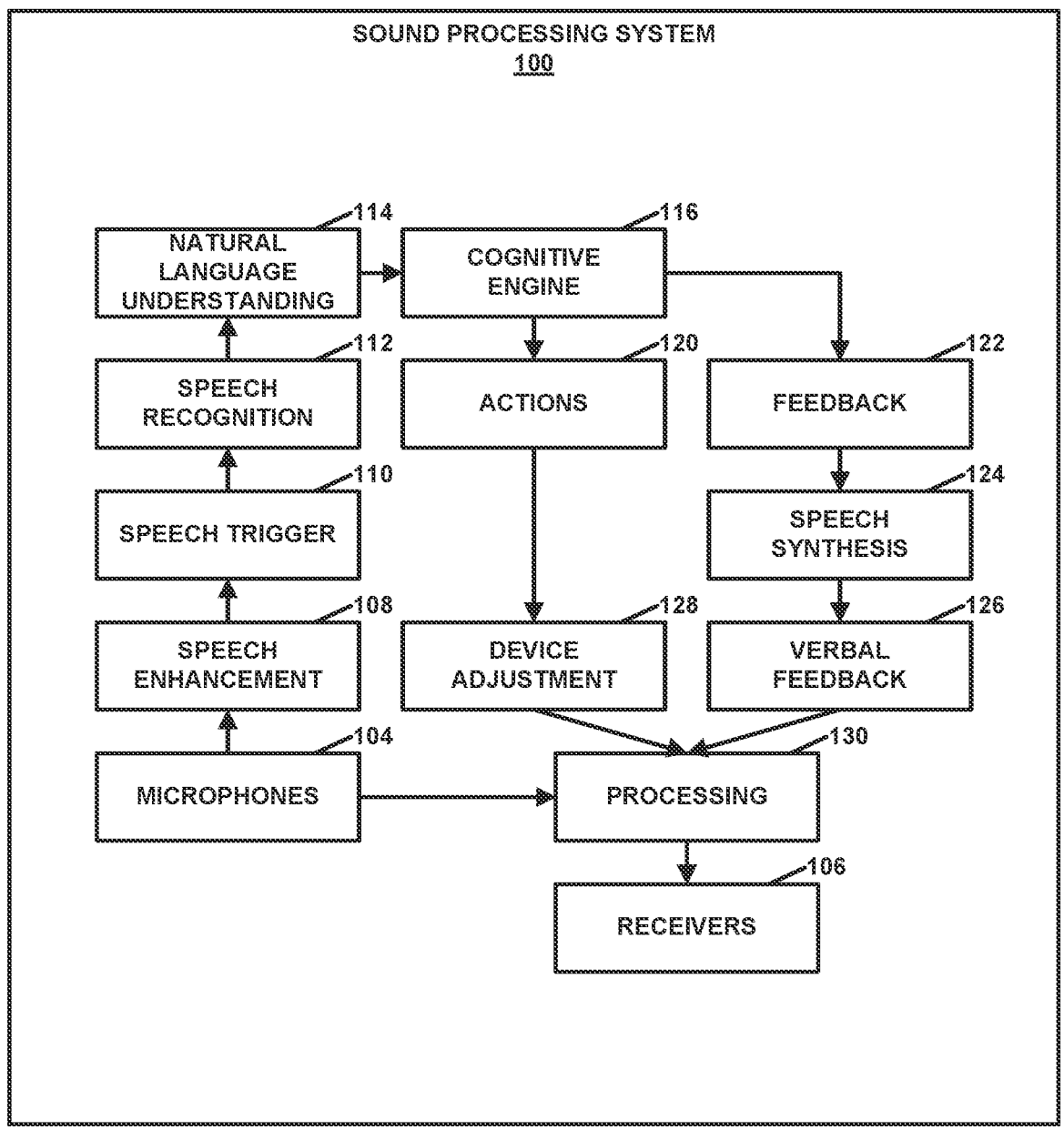
FIG. 1 is a block diagram illustrating an example sound processing system, in accordance with one or more techniques of this disclosure.

A hearing device may comprise various types of devices designed to be worn in and/or on an ear of a wearer. For example, a hearing device may comprise a hearing assistance device (e.g., a hearing aid device, a Personal Sound Amplification Product (PSAP), etc.), a wireless headset, a headphone, a wireless earbud, or another type of device designed to be worn in, around, or on an ear of a user. In another example, a hearing device comprises a hearable. In some examples, the hearing devices in this disclosure may be implantable or non-implantable hearing devices.

Currently, hearing device users rely on push buttons, volume controls, remote controls, and smartphones to control and adjust their hearing devices. However, it is often difficult for many elderly users to use these existing controls due to decreased dexterity. In addition, in some situations where the user's hands are occupied with other activities, such as carrying goods, riding a busy train or bus, exercise, etc., it is not practical to use these existing means to control and adjust their hearing devices.

In addition, when the user encounters a listening difficulty in the field, there is limited adjustment capability available through the existing user interface. A listening difficulty refers to a problem with user's hearing device or hearing devices that prevents the user from listening to sounds that the user wants to listen to or a problem with the user's hearing device or hearing devices that causes the user's hearing device or hearing devices to produce sounds that are undesirable to the user. Such listening difficulties may occur after the user has gone through a fitting process to adjust the hearing devices to the user's hearing profile. In some examples, such listening difficulties may occur as part of a fitting process. For instance, the user may obtain the hearing devices over-the-counter without setting up a fitting appointment with an audiologist. In such examples, default hearing device states of the hearing aids (i.e., hearing device states preloaded into the hearing devices) may not be ideal for the user.

In prior technologies, the ability to learn from the user's own and other users' past adjustments and experience is almost absent. Significant amounts of hearing device and troubleshooting knowledge and experience remain only available to audiologists and doctors through fitting software in the clinic. Often, the user needs to wait for days or weeks to go back to the clinic and troubleshoot the issue with the audiologist or doctor away from the environment where the difficulty occurs. Hence, opportunities to troubleshoot and adjust the hearing devices on the spot are often missed.

Existing approaches that use voice control for hearing devices mostly rely on single-word based commands to control hearing devices. Some existing approaches achieve this using hearing device microphone(s) within the hearing devices while other existing approaches achieve this in the remote device using the microphone signal from either a remote device or the hearing device. The existing approaches are neither natural nor interactive because the existing approaches are mostly designed to replace existing push button and volume control on the hearing devices. As a result, the existing approaches are unable to leverage the vast amount of expert knowledge and experience and learn from the user and user population. The existing approaches may be ineffective at resolving complex listening difficulties on the spot.

This disclosure describes systems that may allow a user to interact with hearing devices in a way that seems natural, robust and intelligent to the user by using speech technologies and artificial intelligence algorithms, such as machine learning algorithms. The techniques of this disclosure can be realized in various ways.

FIG. 1 is a block diagram illustrating an example sound processing system 100, in accordance with one or more techniques of this disclosure. Sound processing system 100 is a system that includes one or more hearing devices. For instance, in some examples, sound processing system 100 includes a single hearing device. In another example, sound processing system 100 includes two hearing devices. In another example, sound processing system 100 includes two hearing devices and a body-worn device. In yet another example, sound processing system 100 includes two hearing devices, a body-worn device, and a cloud-based computing system. Sound processing system 100 allows a user of sound processing system 100 to interact with the one or more hearing devices of sound processing system 100 using speech technologies.

In the example of FIG. 1, sound processing system 100 may include one or more microphones 104 and one or more receivers 106. Microphones 104 are devices configured to detect sound. Receivers 106 are devices configured to generate sound. Microphones 104 and receivers 106 may be distributed among one or more hearing devices of sound processing system 100.

Furthermore, in the example of FIG. 1, sound processing system 100 is shown as including a set of blocks. These blocks include a speech enhancement block 108, a speech trigger detection block 110, a speech recognition block 112, a natural language understanding block 114, a cognitive engine 116, actions 120, feedback 122, a speech synthesis block 124, verbal feedback 126, one or more device adjustment blocks 128, and one or more processing blocks 130. Processing blocks 130 process audio signals (e.g., audio signals from microphones 104, verbal feedback 126, etc.) according to current hearing device states of the hearing devices. Hearing device states may also be referred to herein as hearing device settings.

Each of the blocks corresponds to a set of activities performed by sound processing system 100 or to a set of data. The set of activities corresponding to a block may be performed by one or more processors (i.e., processing circuits) included in devices of sound processing system 100. A set of data corresponding to a block may be stored in volatile or non-volatile storage. In this disclosure, the term processor refers to a processing circuit, such as fixed-function or programmable processing circuits. Examples of processing circuits include microprocessors, digital signal processors, application-specific integrated circuits (ASICs), field-programmable gate arrays (FPGAs), and so on. Execution of instructions stored on computer-readable data storage media may cause programmable circuits to perform various functions. The processors performing the activities corresponding to the blocks may be distributed among various computing devices of sound processing system 100. FIG. 2, FIG. 3, FIG. 4, and FIG. 5 are block diagrams illustrating example implementations of sound processing system 100 in which the activities and data corresponding to the blocks are distributed among computing devices of sound processing system 100 in different ways.

Figure 2:
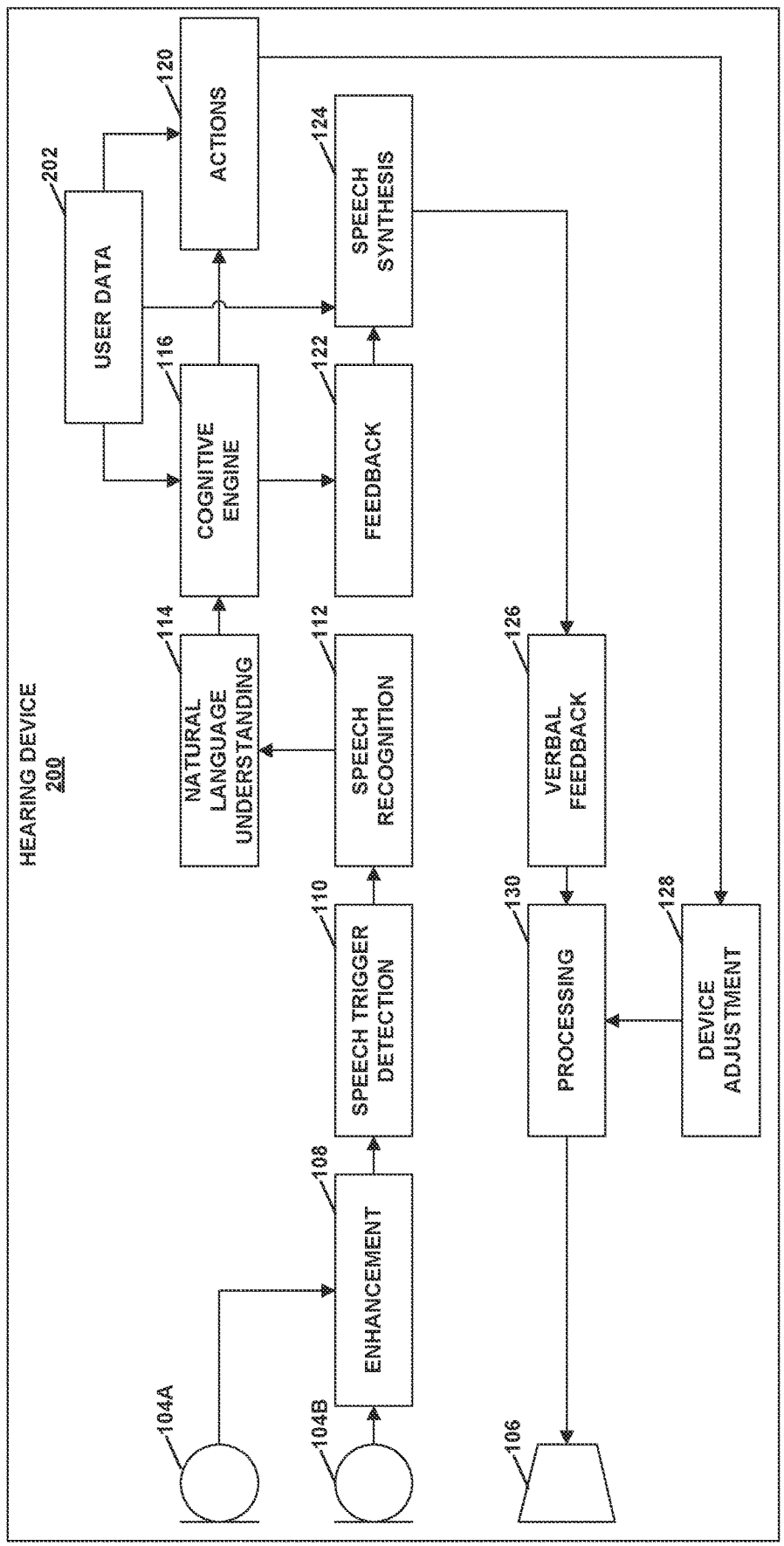
FIG. 2 is a conceptual diagram of an example implementation of the sound processing system in which the sound processing system comprises a single hearing device, in accordance with one or more techniques of this disclosure.

FIG. 2 is a conceptual diagram of an example implementation of sound processing system 100 in which sound processing system 100 comprises a single hearing device 200, in accordance with one or more techniques of this disclosure. Hearing device 200 includes at least one microphone, at least one processor (i.e., at least one processing circuit), at least one volatile storage element and at least one non-volatile storage element, and at least one receiver. Particularly, in the example of FIG. 2, hearing device 200 includes microphone 104A and microphone 104B. Furthermore, in the example of FIG. 2, hearing device 200 includes a receiver 106. As shown in the example of FIG. 2, hearing device 102 includes one or more processors that perform the activities of enhancement block 108, speech trigger detection block 110, speech recognition block 112, natural language understanding block 114, cognitive engine 116, actions 120, feedback 122, speech synthesis block 124, verbal feedback 126, device adjustment block 128, and processing block 130.

Hearing device 200 also includes one or more storage elements configured to store user data 202. User data 202 may include data regarding one or more of the user's preferences, the user's experiences, the user's patterns, the user's current geographic location, the user's current acoustic environment, the current hearing device state of the hearing devices of sound processing system 100, or other information regarding the user or devices of the user. The user's patterns may include information about the user's daily routines.

Figure 3:
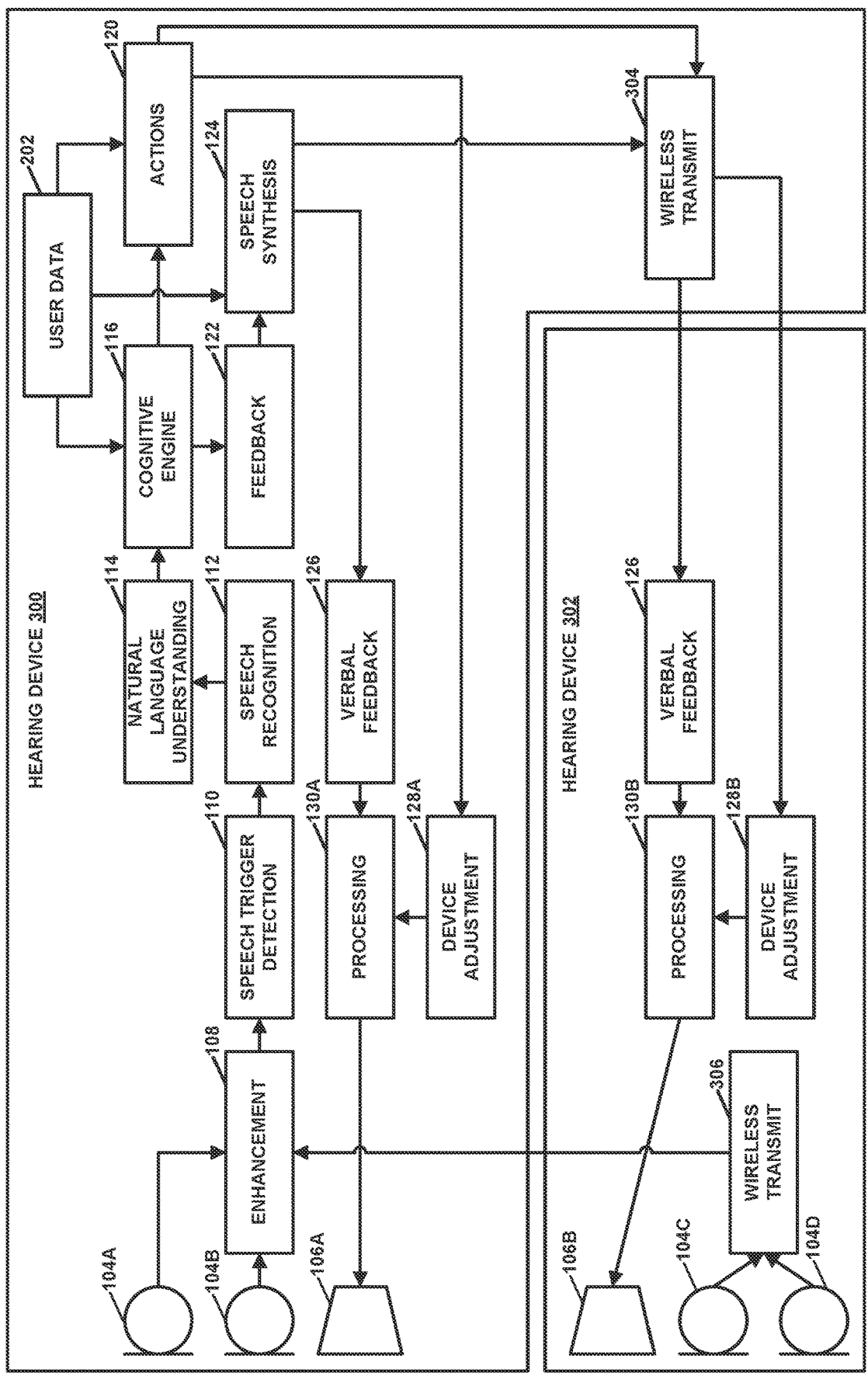
FIG. 3 is a conceptual diagram of an example implementation of the sound processing system in which the sound processing system comprises a pair of hearing devices, in accordance with one or more techniques of this disclosure.

FIG. 3 is a conceptual diagram of an example implementation of sound processing system 100 in which sound processing system 100 comprises a pair of hearing devices 300, 302, in accordance with one or more techniques of this disclosure. Hearing devices 300, 302 are configured to wirelessly communicate with each other. In some examples, each of hearing devices 300, 302 has at least one microphone, at least one processor (i.e., at least one processing circuit), at least one volatile storage element and at least one non-volatile storage element and at least one receiver.

In the example of FIG. 3, hearing device 300 includes microphone 104A and microphone 104B. Hearing device 300 also includes a receiver 106A. Furthermore, in the example of FIG. 3, hearing device 300 includes enhancement block 108, speech trigger detection block 110, speech recognition block 112, natural language understanding block 114, cognitive engine 116, actions 120, feedback 122, speech synthesis block 124, verbal feedback 126, device adjustment block 128A, processing block 130, and a wireless transmit block 304. Hearing device 300 also includes one or more storage elements configured to store user data 202. Processing block 130A may process verbal feedback 126 and the audio signals produced by microphones 104A, 104B for output by receiver 106A.

In the example of FIG. 3, hearing device 302 includes a receiver 106B, microphone 104C and microphone 104D. Furthermore, in the example of FIG. 3, hearing device 302 includes a wireless transmit block 306, verbal feedback 126, a device adjustment block 128B, and a processing block 312. Wireless transmit block 306 may wirelessly transmit the one or more audio signals produced by microphones 104C and 104D to a master hearing device (i.e., hearing device 500 in FIG. 3). Processing block 130B may process verbal feedback 126 and the audio signals produced by microphones 104C, 104D for output by receiver 106B. In this disclosure, the master hearing device is the hearing device of the pair of hearing devices that controls at least the process for enhancing and detecting the user's own speech signal for purposes of ultimately resolving a listening difficulty being described by the user in the user's own speech signal.

Figure 4:
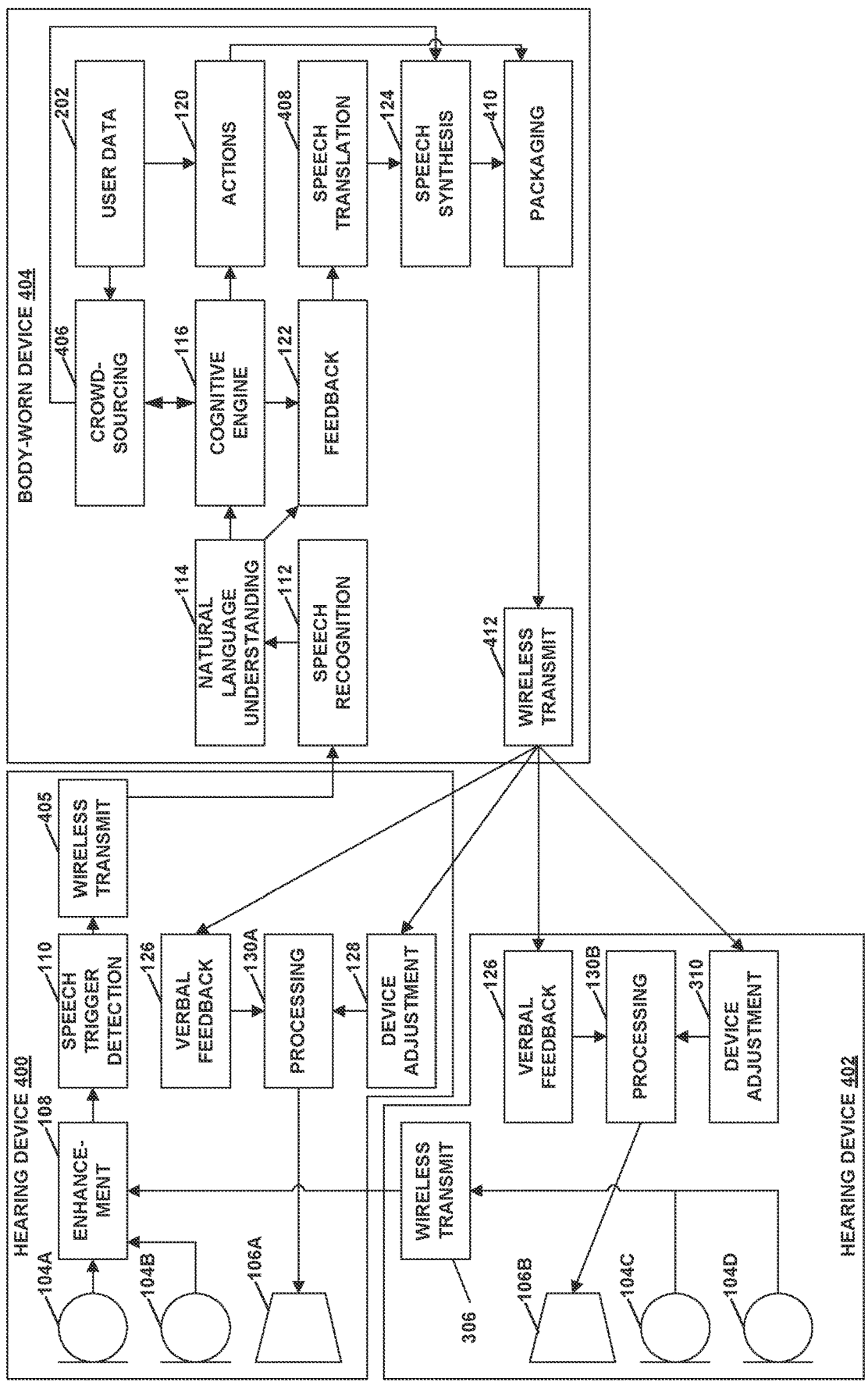
FIG. 4 is a conceptual diagram of an example implementation of the sound processing system in which the sound processing system comprises a pair of hearing devices and a body-worn device, in accordance with one or more techniques of this disclosure.

FIG. 4 is a conceptual diagram of an example implementation of sound processing system 100 in which sound processing system 100 comprises a pair of hearing devices 400, 402 and a body-worn device 404, in accordance with one or more techniques of this disclosure. In some examples, hearing device 400 is a left hearing device and hearing device 402 is a right hearing device. In other examples, hearing device 400 is a right hearing device and hearing device 402 is a left hearing device. In the example of FIG. 4, hearing devices 400, 402 are configured to wirelessly communicate with each other and are also configured to wirelessly communicate with body-worn device 404. In other examples, sound processing system 100 may include a single hearing device and body-worn device 404.

In some examples, body-worn device 404 has at least one processor (i.e., at least one processing circuit), at least one volatile storage element, and at least one non-volatile storage elements. Body-worn device 404 can take the form of a smartphone, a smartwatch, smart personal assistant, or another type of mobile computing device that is worn, carried, or otherwise designed to be mobile with the user. In some examples, each of hearing devices 400, 402 may have at least one microphone, at least one processor (i.e., at least one processing circuit), at least one volatile storage element, at least one non-volatile storage element, and at least one receiver.

In the example of FIG. 4, hearing device 400 includes microphone 104A, microphone 104B, and receiver 106A. Hearing device 400 also includes enhancement block 108, speech trigger detection block 110, verbal feedback 126, device adjustment block 128A, processing block 130, and a wireless transmit block 405. Hearing device 402 includes receiver 106B, microphone 104C, and microphone 104D. Additionally, hearing device 402 includes wireless transmit block 306, verbal feedback 126, device adjustment block 128B, and processing block 312.

Furthermore, in the example of FIG. 4, body-worn device 404 includes speech recognition block 112, natural language understanding block 114, cognitive engine 116, actions 120, feedback 122, speech synthesis block 124, a crowdsourcing block 406, a speech translation block 408, a packaging block 410, and a wireless transmit block 412. Additionally, body-worn device 404 includes one or storage devices that store user data 202.

Figure 5:
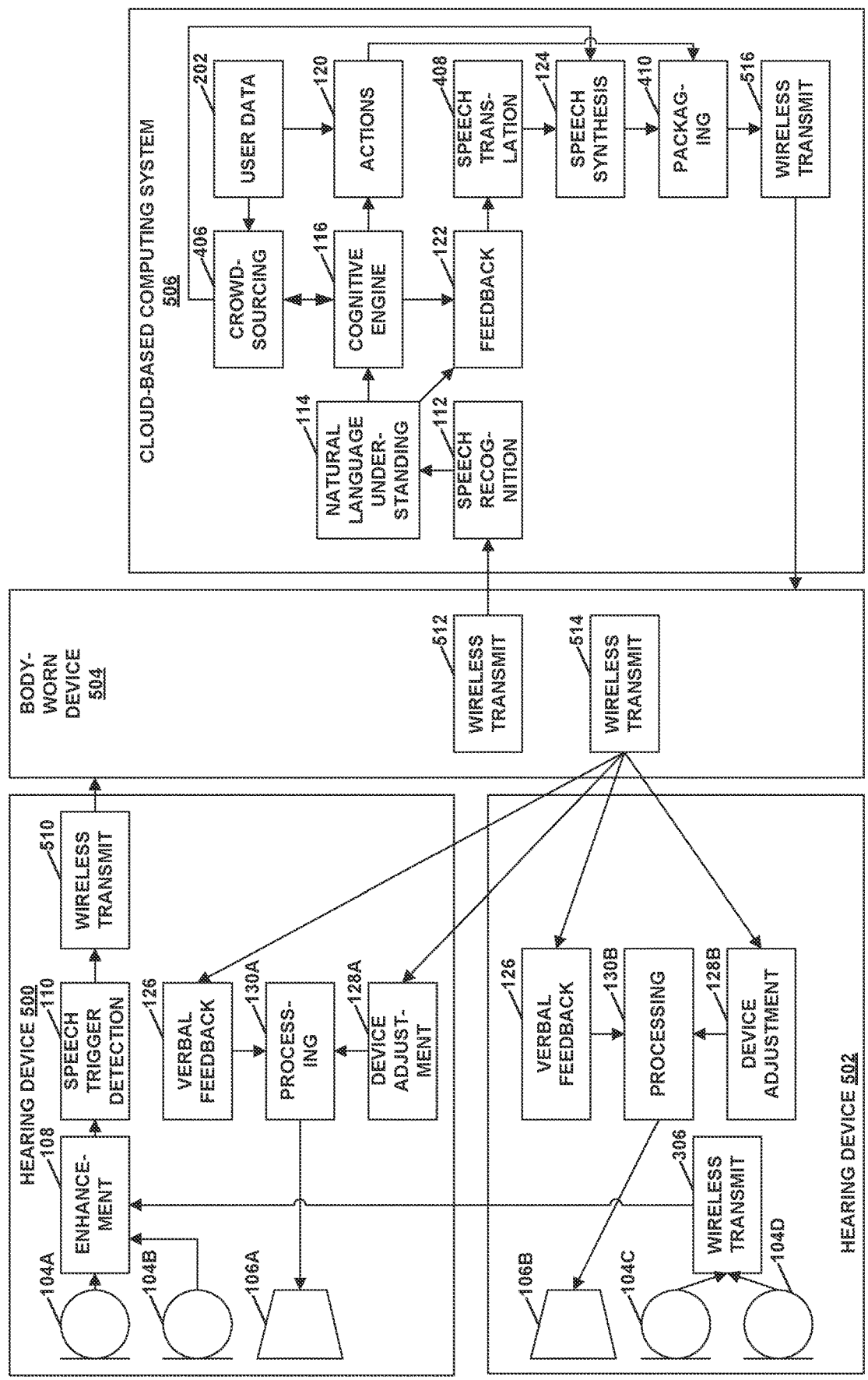
FIG. 5 is a conceptual diagram of an example implementation of the sound processing system comprising a pair of hearing devices, a body-worn device, and a cloud-based computing system, in accordance with one or more techniques of this disclosure.

FIG. 5 is a conceptual diagram of an example implementation of sound processing system 100 comprising a pair of hearing devices 500, 502, a body-worn device 504, and a cloud-based computing system 506, in accordance with one or more techniques of this disclosure. In the example of FIG. 5, hearing devices 500, 502 are configured to wirelessly communicate with each other and are configured to wirelessly communicate with body-worn device 504, which in turn is wirelessly connected to cloud-based computing system 506. In some examples, hearing device 500 is a left hearing device and hearing device 502 is a right hearing device. In other examples, hearing device 500 is a right hearing device and hearing device 502 is a left hearing device. In other examples, sound processing system 100 may include a single hearing device, body-worn device 504 and cloud-based computing system 506.

In some examples, cloud-based computing system 506 has at least one processor (i.e., at least one processing circuit), at least one volatile storage element, at least one non-volatile storage element. Cloud-based computing system 506 may be implemented as one or more server devices. Cloud-based computing system 506 may be configured to communicate with multiple body-worn devices wirelessly at the same time. For instance, cloud-based computing system 506 may process speech signals received from multiple body-worn devices associated with different users. Communication connections between the body-worn devices and cloud-based computing system 506 may each include at least one wireless communication link and may also include one or more wireless communication links. For instance, the body-worn devices may wirelessly communicate with wireless base stations that have wired connections through the Internet to cloud-based computing system 506.

In some examples, body-worn device 504 may have at least one processor (i.e., at least one processing circuit), at least one volatile storage element, and at least one non-volatile storage element. Body-worn device 504 can take the form of a smartphone, a smartwatch, smart personal assistant, or another type of mobile computing device. In some examples, each of hearing devices 500, 502 may have at least one microphone, at least one processor (i.e., at least one processing circuit), at least one volatile, at least one non-volatile storage element, and at least receiver.

In the example of FIG. 5, hearing device 500 includes microphone 104A, microphone 104B, and receiver 106A. Hearing device 500 also includes enhancement block 108, speech trigger detection block 110, verbal feedback 126, device adjustment block 128A, processing block 130, and a wireless transmit block 510. Hearing device 502 includes receiver 106B, microphone 104C, microphone 104D, wireless transmit block 306, verbal feedback 126, a device adjustment block 128B, and processing block 312. Body worn device 504 includes a wireless transmit block 512 and a wireless transmit block 514. Cloud-based computing system 506 includes speech recognition block 112, natural language understanding block 114, cognitive engine 116, actions 120, feedback 122, speech synthesis block 124, crowdsourcing block 406, speech translation block 408, packaging block 410, and a wireless transmit block 516. Cloud-based computing system 506 also includes one or more storage elements configured to store user data 202.

Functionally, each implementation of sound processing system 100 (e.g., the example implementations shown in FIG. 2, FIG. 3, FIG. 4, and FIG. 5) may comprise some or all of the following functional components: Talker's speech pickup, speech trigger, speech enhancement, wireless transmission of enhanced speech, speech recognition, natural language understanding, a cognitive engine or business logic, action generation, user feedback, language translation, speech synthesis, wireless transmission of actions and verbal user feedback, hearing device adjustment and feedback. In the following sections, this disclosure describes each of the above functional components in detail and how the functional components work together to form an intelligent, natural and easy-to-use system.

Talker's Speech Pickup

Microphones 104 may detect sound and generate an audio signal (i.e., a microphone signal) representative of the detected sound. The detected sound may include the speech sounds of a user of sound processing system 100. In other words, sound processing system 100 may pick up the user's own speech using one or more microphones 104 (shown as circles with tangent lines in FIGS. 2-5) from the single hearing device 200 in the example of FIG. 2 in a monaural way and one or more microphones from both hearing devices 300 and 302 in the example of FIG. 3, hearing devices 400 and 402 in the example of FIG. 4, and hearing device 500 and 502 in the example of FIG. 5 in a binaural way where the microphone signals and/or related statistics from one hearing device are wirelessly transmitted to the other hearing device (referred to herein as the master device).

Speech Enhancement

Enhancement block 108 may enhance the signal of the user's own speech in the audio signal produced by microphones 104. Thus, in the examples of FIGS. 2-5, one of the hearing devices is a master hearing device, the master hearing device is configured to enhance the user's own speech signal, and the master hearing device may be configured to reduce background noise and interference using microphones 104 from both the hearing devices. Because the microphone signals often contain noise, reverberation, and interference, at least one of the hearing devices (e.g., at least one of hearing devices 200, 300, 302, 400, 402, 500, and 502) enhances the own-speech signal (i.e., the speech signal of user's own voice) to reduce noise, reverberation, and interference using a multiple-microphone speech enhancement approach. Examples of multiple-microphone speech enhancement approaches range from traditional beamforming and postfiltering approaches to modern deep neural network (DNN)-based speech enhancement. Thus, in one example, sound processing system 100 enhances the own-speech signal by applying beamforming to the signals produced by microphones 104 and then performing postfiltering on the resulting beamformed signal. In some examples, postfiltering may include one or more of noise reduction, applying a prescribed gain, enhancement of particular speech sounds, and other forms of signal processing that occur after beamforming is applied. In the example of FIG. 2, speech enhancement may take the form of a monaural speech enhancement. In other words, in the example of FIG. 2, enhancement block 108 may produce a single speech-enhanced audio signal. In the examples of FIG. 3, FIG. 4, and FIG. 5, speech enhancement may take the form of a binaural speech enhancement in the master device. In other words, in the examples of FIG. 3, FIG. 4, and FIG. 5, enhancement block 108 may produce a pair of speech-enhanced audio signals.

Speech Trigger

Speech trigger detection block 110 may detect whether speech is present in the enhanced audio signal. Because speech recognition and/or wireless transmission of the enhanced speech signal consumes significant battery power for a master device (e.g., hearing device 200 of FIG. 2, hearing device 300 of FIG. 3, hearing device 400 of FIG. 4, and hearing device 500 of FIG. 5), speech recognition and wireless transmission of the enhanced speech signal may be activated only when necessary and deactivated otherwise. To achieve this, a trigger (labeled "SPEECH TRIGGER DETECTION" in FIGS. 2-5) may be implemented in hearing device 200 of FIG. 2 and in the master devices of FIG. 3, FIG. 4, and FIG. 5 (i.e., hearing device 300 of FIG. 3, hearing device 400 of FIG. 4, and hearing device 500 of FIG. 5). In this disclosure, such a trigger can be based on one of the following approaches:

1. A short-term energy detection based on the enhanced speech for a low-cost device.
2. A voice activity detection based on the enhanced speech for a sophisticated device.
3. (1) followed by (2) based on the enhanced speech for a more sophisticated device that achieves better power saving than (2)

In the examples above, energy detection may include determining whether an energy level (e.g., in dB Sound Pressure Level (dB SPL) of the enhanced speech signal is consistent with an energy level of understandable human speech. Furthermore, in the examples above, speech trigger detection block 110 may perform voice activity detection using a neural network that is trained to determine whether or not audio signals include human speech sounds. In other examples, speech trigger detection block 110 may use other techniques for voice activity detection, such as analyzing line spectral frequencies, full-band energy, low-band energy, and zero-crossing rate, as described in the G.729 standard.

In another example, speech trigger detection block 110 may use an Improved Minima Controlled Recursive Averaging algorithm as applied in the Speex audio compression format.

In some examples where sound processing system 100 includes two hearing devices (e.g., as shown in the examples of FIG. 3, FIG. 4, and FIG. 5), one of the hearing devices may serve as a master hearing device (e.g., hearing device 300 in FIG. 3, hearing device 400 in FIG. 4, and hearing device 500 in FIG. 5). In such examples, the master hearing device is configured to use a trigger (e.g., an activation trigger) to activate speech recognition only when necessary. The non-master hearing device does not enhance the audio signals or analyze the audio signals to detect whether the audio signals contain an activation trigger.

In some examples, rather than continually applying speech enhancement to an audio signal and detecting whether the enhanced audio signal contains speech sounds, sound processing system 100 may apply speech enhancement and may forward the enhanced audio signal for speech recognition in response to receiving an indication of non-verbal user input. For example, sound processing system 100 may apply speech enhancement first and may forward the enhanced audio signal for speech recognition in response to detecting that the user has pushed a button on one of the hearing devices of sound processing system 100. In some examples, sound processing system 100 may apply speech enhancement and may forward the enhanced audio signal for speech recognition in response to detecting a gesture (e.g., a tapping pattern) on a shell of one or more of the hearing devices of sound processing system 100.

Wireless Transmission of Enhanced Speech

Wireless transmit blocks 405 and 510 may wirelessly transmit enhanced speech signals. For example, the master device (e.g., hearing device 400 of FIG. 4 and hearing device 500 of FIG. 5) may strip silent segments from the enhanced speech signal, encode the speech segments, and wirelessly transmit the encoded speech segments to body-worn device 404 of FIG. 4 and to cloud-based computing system 506 of FIG. 5 wirelessly via body-worn device 504.

Speech Recognition

There are many speech signals from different talkers in our daily environments. Speech recognition block 112 may isolate the user's own voice from other speech sounds. Thus, sound processing system 100 may implement a speech recognition algorithm (labeled "SPEECH RECOGNITION" in FIGS. 2-5) that is trained using the user's own speech to reduce false alarms from other unintended talkers. The more training using the user's own speech in the field, the better and more intelligent the speech recognition may be. To further reduce false alarms by an unintended talker, the user may be asked to talk naturally to the hearing device(s) by always starting with a unique word or phrase (i.e., an activation trigger) followed by the intended message or sentence(s). The unique word or phrase may comprise more than one syllable and may utilize voiced consonants as much as possible. Furthermore, the user can use a predetermined unique word (or phrase) or a user-created unique word (or phrase) that is recorded in the field. The activation trigger may be a unique multi-syllable word (or phrase), so as to guard against unintended speech interpretation. Thus, a request from the user may comprise a configurable unique name (or phrase) followed by one or more sentences for the user to interact with sound processing system 100. Once the speech trigger activates the speech recognition algorithm, the speech recognition algorithm first seeks to recognize the unique word (or phrase) in the enhanced speech and then converts the subsequent enhanced speech into text in the examples of FIG. 2 and FIG. 3. In the examples of FIG. 4 and FIG. 5, the speech recognition algorithm may convert the enhanced speech directly to text.

Natural Language Understanding

Natural language understanding block 114 may determine the intended meaning of the user's speech. A natural language understanding algorithm (labeled "NATURAL LANGUAGE UNDERSTANDING" in FIGS. 2-5) takes the converted text from speech recognition block 112 and attempts to interpret the text's intended meaning (e.g., using machine learning). It can take a simple form of understanding that the user is trying to increase the volume control or change information stored in memory of the hearing devices in the examples of FIG. 2 and FIG. 3, all the way to a more complex understanding that the user is unhappy about the listening experience with hearing devices 400, 402 in the example of FIG. 4, and hearing devices 500, 502 in the example of FIG. 5.

In some examples, to perform natural language understanding, natural language understanding block 114 checks the text for keywords or key phrases that describe listening difficulties. Such keywords or key phrases may include words like "loud," "quiet," "soft," "whistling," "noisy," "wind noise," "echo," "sharp," and so on, along with synonyms of such keywords or key phrases. Natural language understanding block 114 may also check for negation words, such as "not." The keywords or key phrases may be mapped to predefined categories. For instance, "quiet" and "soft" may be mapped to the same predefined category. The input to cognitive engine 116 may include a vector containing elements corresponding to the categories. The value of an element in the vector may indicate whether the text includes keywords or key phrases mapped to the category corresponding to the element. For example, the vector may include a first element for wind noise, a second element for sharpness, and so on. In this example, the value of the first element may be equal to 1 if the text includes a keyword or key phrase mapped to the wind noise category and may be equal to 0 otherwise. Similarly, in this example, the value of the second element may be equal to 1 if the text includes a keyword or key phrase mapped to the sharpness category and may be 0 otherwise. Thus, in some examples, the vector may include multiple elements having values that indicate that the text includes key words or key phrases corresponding to the categories corresponding to the elements. For instance, in the previous example, either or both the first and second elements may have values equal to 1. In some examples, the values of the elements may have non-binary values. For instance, if the user includes an intensifier word, such as "very" or "extremely," with respect to a keyword or key phrase, the value of an element corresponding to the category mapped to the keyword or key phrase may be greater than 1 (e.g., 2 or 3).

Cognitive Engine

Cognitive engine 116 may generate actions for the hearing devices of sound processing system 100. The natural language understanding output is provided to a cognitive engine (labeled, "COGNITIVE ENGINE" in FIGS. 2-5) to generate a set of intelligent actions for the hearing devices of sound processing system 100 and user feedback.

Individuals with hearing loss typically lose sensitivity with respect to some frequency bands more than other frequency bands. Accordingly, a user's hearing aid may be customized to increase the gain of a frequency band in which the user has lost sensitivity or may shift the sound to a frequency band that the user is better able to hear. The user's hearing profile may include data regarding the user's sensitivity in difference frequency bands and/or compressor parameters. Furthermore, because the degree of hearing loss in different frequency bands may differ from user to user, sounds produced by a hearing device may sound good to one user but not a different user. Moreover, whether or not the sound produced by a hearing device sounds good to the user may differ depending on the user's acoustic environment. For instance, the sound produced by a hearing device may sound good to the user when the user is in an audiologist's office but does not sound good to the user when the user is in a busy restaurant. Moreover, it may be difficult for the user to explain exactly how or why the sound produced by a hearing device does not sound good.

Cognitive engine 116 may determine actions 120 and feedback 122 based on a set of inputs that includes the interpreted text produced by natural language understanding block 114. Actions 120 may indicate actions selected for the user to resolve a listening difficulty experienced by the user of sound processing system 100 and expressed in the spoken content of the user's own speech signal. For instance, actions 120 may improve the fitting (e.g., the initial settings of hearing device states) of the hearing devices.

The set of inputs used by cognitive engine 116 may include various types of information. For example, the set of inputs may include input based on the text as interpreted by natural language understanding block 114 (i.e., the spoken content). For instance, the set of inputs may include a vector comprising elements corresponding to different categories. Additionally, the set of inputs to cognitive engine 116 may include a current hearing device state and data regarding a current acoustic environment of the hearing devices of sound processing system 100. The current hearing device state comprises data describing the current state of the hearing devices of sound processing system 100. For instance, the current hearing device state of a hearing device may include data indicating a current global gain level across frequency bands, data indicating gain levels for individual frequency bands, data indicating whether noise reduction is enabled, and so on. Different aspects of the current hearing device state for each of the hearing devices may correspond to different elements in an input vector provided to cognitive engine 116. The data regarding the current acoustic environment may include data indicating overall sound levels, the level of a target signal, noise levels, reverberation levels, sound reflection levels, and other information about the user's current acoustic environment. Different aspects of the current acoustic environment may correspond to different elements in an input vector provided to cognitive engine 116. Each of these elements may have a quantitative value. Forming these elements as quantitative values may enable aspects of one or more of the hearing device state, acoustic environment, preferences of the user, experiences of the user, patterns of the user, and so on to be used in a neural network. Thus, techniques of this disclosure may resolve technical shortcomings of previous approaches in that information that was not available for use in changing hearing device states, especially for addressing listening problems of the user, is available in the techniques of this disclosure for use in a neural network implemented by cognitive engine 116 to determine actions 120 and/or feedback 122.

The determined actions and user feedback may be determined by cognitive engine 116 based on not only a current hearing device state and acoustic environment, but also the user's hearing profile, information regarding the user's preferences, information regarding the user's experiences, information regarding the user's patterns, information regarding the user's current geographic location, and/or other information. In some examples, each of these types of data may also correspond to elements in an input vector or to values of elements in the input vector.

As noted above, in some examples, the input vector may include elements corresponding to different types of geographical locations. In some examples, the user's geographic location may be determined using a satellite navigation module of body-worn device 404 or body-worn device 504. Including information regarding the user's current geographic location may help refine the current hearing device states for specific geographic locations or types of geographic locations. For instance, the hearing devices of sound processing system 100 may be configured with different profiles for different geographic locations. For instance, the profiles may include a restaurant profile, a theatre profile, a home profile, and so on. Each of the profiles may correspond to a different hearing device state appropriate for the acoustic conditions likely to be present at those geographic locations. In some examples, actions 120 determined by cognitive engine 116 may be limited to changes to the profiles for the user's current geographic location.

The user's preferences, experiences, and patterns may similarly be categorized and quantified so that the user's preferences, experiences, and patterns may be represented using values of elements in an input vector to cognitive engine 116.

In some examples, cognitive engine 116 captures expert knowledge and business knowledge in existing fitting software (e.g., an expert assistant in INSPIRE™ from Starkey Hearing Technologies and other fitting software), but also machine learning algorithms to continue to learn from what both the user and other hearing device users' do. For example, cognitive engine 116 may be pretrained to generate actions 120 and feedback 122 that replicate the results of experts and/or expert systems when given similar inputs.

In the examples of FIG. 2 and FIG. 3, cognitive engine 116 may be implemented using a set of business logic due to potentially limited computational resources. In such examples, cognitive engine 116 may generate a set of simple actions and user feedback based on the natural language understanding output, acoustic environment, a current state of the hearing devices, and the user's preference. As noted elsewhere in this disclosure, the actions may include changes to the current hearing device state that attempt to resolve a listening difficulty of the user of sound processing system 100.

In the example of FIG. 4, cognitive engine 116 may learn from the user's experience and patterns in addition to using the above information to generate a set of more intelligent actions and user feedback. In the example of FIG. 4 and FIG. 5, crowdsourcing block 406 includes crowdsourced data. Furthermore, in the example of FIG. 4 and the example of FIG. 5, cognitive engine 116 may learn from other users' experience and patterns using crowdsourcing in addition to using all the above information to generate a set of even more intelligent actions and more personalized user feedback. In other words, cognitive engine 116 may be trained using the crowdsourced data of crowdsourcing block 406. An example of learning in cognitive engine 116 is described elsewhere in this disclosure.

Action Generation

Actions 120 corresponds to data indicating actions identified by cognitive engine 116. That is, one outcome from cognitive engine 116 based on the natural language understanding input is a set of action(s) for the hearing devices to take (labeled, "ACTIONS" in FIGS. 2-5). Such actions can range from simple adjustment of volume control, to activation of binaural noise reduction (e.g., in the examples of FIG. 2 and FIG. 3) to more complex adjustment of compressor parameters and any combination of the above (such as in the examples of FIG. 4 and FIG. 5).

In the context of hearing devices, compression may refer to fitting a first dynamic range of sound levels into a smaller range of sound levels. The smaller range of amplitudes may be a range of sound levels in to which the user has adequate hearing sensitivity. For instance, the user may have trouble hearing sounds quieter than 80 dB sound pressure level (dBSPL) but is able to hear sounds above 80 dBSPL without amplification. The compressor parameters control how the hearing devices apply compression to incoming sounds, such as sound from the environment or artificial sound (e.g., verbal feedback 126). For instance, the compressor parameters may include parameters that define an input/output function that maps input sound intensity levels in dBSPL to gain levels. For instance, the compressor parameters may include one or more threshold knee points. Each of the threshold knee points is a point on the input/output function at which a compression ratio changes. The compression ratio that describes a relationship between increases in input level to increases in output level. For example, below a threshold knee point, the compression ratio may be 1:1, and above the threshold knee point, the compression ratio may be x:1, where x is greater than 1. Thus, in this example, for every x dBSPL increase in the input level, the output level rises by 1 dBSPL. The compressor parameters may define the compression ratios. Other compressor parameters may include attack time and release time. Furthermore, there may be different input/output functions for different frequency bands, each of which has its own compressor parameters. Because the user may have different levels of hearing loss in different ears, there may be different compressor parameters for different hearing devices of the user.

Other actions may include changing programs, activating or deactivating different types of noise reduction and levels thereof, activating or deactivating speech enhancement algorithms, activating or deactivating one or more remote microphones, changing feedback cancelation parameters, performing "A" vs. "B" comparisons, and so on. Types of noise reduction may include binaural noise reduction and monaural noise reduction. Speech enhancement algorithms may include algorithms that accentuate sounds originating from the direction of a person to whom the user is listening (e.g., in front of the user), and may increase levels of sounds in the typical levels and frequencies of human speech. A remote microphone is a microphone separate from the user's hearing devices. For instance, the user's mobile telephone may include a remote microphone. When a remote microphone is enabled, the hearing devices may process an audio signal produced by the remote microphone to generate an audio signal for output by receivers 106.

User Feedback

Feedback 122 includes data indicating feedback to be provided to the user of sound processing system 100. For instance, in addition or as an alternative to the actions of actions 120, another outcome from cognitive engine 116 based on the natural language understanding input may be user feedback (labeled, "FEEDBACK" in FIGS. 2-5). Such feedback 122 may be provided as text and can range from a simple form of "changed to a restaurant profile" as in the examples of FIG. 2 and FIG. 3 to more complex forms of "how do you like the adjustment?" in the examples of FIG. 4 and FIG. 5.

In some examples, feedback 122 may include feedback that mirrors the phrasing of user's request. For example, if the user said "please do [X]" where X is the request, feedback 122 may include feedback that says "I have done [X]."

In some examples, cognitive engine 116 does not generate actions 120, but does generate feedback 122 in response to a user request. For example, a user request may ask sound processing system 100 for information on how to use sound processing system 100. In this example, cognitive engine 116 may generate feedback 122 that contains information on how to use sound processing system 100. For instance, in one example, cognitive engine 116 searches a corpus of help articles. In this example, cognitive engine 116 may generate feedback 122 such that feedback 122 includes the top result in the corpus of help articles. In some examples, sound processing system 100 may provide verbal information to the hearing devices for playback to the user that instructs the user how to care for the hearing devices. Providing information about how to use and care for the hearing devices of sound processing system 100 may be especially useful to users who obtain the hearing devices over-the-counter and do not have a hearing professional present when the user is first starting to use the hearing devices.

Language Translation

Speech translation block 408 may translate a language of the user feedback text. In some examples, the user has the option to translate the user feedback text into the preferred foreign language according to the user's preference in the user database (labeled, "SPEECH TRANSLATION" in FIGS. 4 and 5). In some examples, speech translation block 408 accesses a third-part translation service, such as GOOGLE™ Translate, that provides translations to sound processing system 100. In some examples, feedback 122 may include indexes into a table. Entries in the table may contain text snippets having the same general semantic meaning, but in different languages.

Speech Synthesis

Speech synthesis block 124 may synthesize verbal feedback 126 from the text of feedback 122 or translated user feedback. That is, feedback 122 or the translated user feedback may be converted into a synthesized speech using a speech synthesis algorithm (labeled, "SPEECH SYNTHESIS" in FIGS. 2-5). In some examples, the feedback 122 or translated user feedback may be converted into synthesized verbal feedback 126 according to the user's preference in terms of gender and style in the user database. Verbal feedback 126 may also be referred to as spoken feedback. Speech synthesis block 124 may use any of the existing text-to-speech techniques to perform speech synthesis. For example, speech synthesis block 124 may retrieve prerecorded sound clips for words of the text and arrange the sound clips to form the synthesized verbal feedback 126.

Wireless Transmission of Verbal Feedback and Actions

Packaging block 410 may encode and package synthesized verbal feedback 126 generated by speech synthesis block 124. The synthesized speech (i.e., verbal feedback 126) may be encoded and packaged with the action(s) (labeled, "PACKAGING" in FIGS. 4 and 5). Packaging block 410 may use various encoding techniques to encode verbal feedback 126, such as the OPUS codec, the Codec2 codec, or other speech compression codecs. The resulting packaged data are wirelessly transmitted from body-worn device 404 to hearing devices 400, 402 in the example of FIG. 4 (as represented by wireless transmit block 412), and from cloud-based computing system 506 to hearing devices 500, 502 via body-worn device 504 in the example of FIG. 5 (as represented by wireless transmit block 516 and wireless transmit block 514) in FIG. 5.

Hearing Device Adjustment and Feedback

Device adjustment blocks 128 may make adjustments to the hearing devices of sound processing system 100. Based on the received action(s), each hearing device may make an adjustment (labeled "DEVICE ADJUSTMENT" in FIGS. 2-5) in terms of relevant algorithms and parameters directly in the example of FIG. 2, and in an asynchronous or a synchronous manner in the examples of FIG. 3, FIG. 4, and FIG. 5. For example, device adjustment blocks 128 may update the current hearing device states of the hearing devices of sound processing system 100 based on actions 120. For instance, if one of actions 120 indicates that binaural noise reduction is to be enabled, device adjustment blocks 128 may update the current hearing device states such that binaural noise reduction is enabled.

In addition, verbal feedback 126 includes speech synthesized data corresponding to feedback 122 generated by cognitive engine 116. Processing blocks 130 may process verbal feedback 126 to play out the received verbal feedback using receivers 106 of the hearing devices. Receivers 106 may play out the received verbal feedback 126 directly in the example of FIG. 2 and may play out the received verbal feedback 126 in a synchronized binaural way in the examples of FIG. 3, FIG. 4, and FIG. 5. In FIGS. 2-5, receivers 106 are shown as trapezoids.

As noted elsewhere in this disclosure, the user may prefer different hearing device states for different situations. For example, the user may prefer the hearing devices be in first hearing device states when the user is at a first geographic location and may prefer the hearing device be in second hearing device states when the user is at a second geographic location. In some examples, if the user is satisfied with the hearing device states, sound processing system 100 may verbally ask the user whether the user would like to save the hearing device states and associate the hearing device states with a particular name. A set of saved hearing device states may be referred to in this disclosure as a saved profile. For instance, in one example, sound processing system 100 may associate the hearing device states with the name "beach profile." In this example, sound processing system 100 may adjust the current hearing devices to the saved hearing device states associated with the name "beach profile" when sound processing system 100 receives a spoken request from the user to change the current hearing device states to the hearing device states associated with the "beach profile."

In some examples, sound processing system 100 may save profiles for a user along with sets of metadata for the saved profiles. In some examples, sound processing system 100 may automatically save such profiles and their associated metadata. In some examples, sound processing system 100 may save profiles and their associated metadata in response to verbal requests from the user. The metadata associated with a saved profile may include a variety of different types of information. For instance, the metadata associated with a saved profile may include one or more of: dates and times when the saved profile was used, geographic locations where the saved profile was used, types of acoustic environments where the saved profile was used, or other information. In such examples, the user of sound processing system 100 may verbally instruct sound processing system 100 to change the hearing device states to a saved profile using the metadata associated with the saved profile. For example, a saved profile may be associated with metadata indicating that the saved profile was used when the user was at a beach. In this example, sound processing system 100 may change the hearing device states to this saved profile in response to a verbal request from the user such as "change to the profile I use at when I'm at the beach." In another example, a saved profile may be associated with metadata indicating that the saved profile was used last Wednesday. In this example, sound processing system 100 may change the hearing device states to this saved profile in response to a verbal request from the user such as "change to the profile I used last Wednesday." In some examples in which multiple saved profiles fit the user's request, sound processing system 100 may verbally request clarification based on the metadata of the saved profiles that fit the user's request. For example, if two different saved profiles were used last Wednesday, sound processing system 100 may verbally ask the user whether the user would like to use the saved profile used last Wednesday while the user was at home or the save profile used last Wednesday while the user was at the beach. In another example, if more than one profile exists that matches the user's request, the user may be given the option of listening to the two profiles and selecting the preferred one. In this case, the user may also be given the option of choosing which profile becomes the default the next time the individual is in that or a similar environment.

Furthermore, in some examples, sound processing system 100 may be automatically configured to change the current hearing device states to particular saved profiles. For example, a first saved profile may be associated with the user's home and a second saved profile may be associated with the user's office. In this example, sound processing system 100 may automatically change the hearing device states to the first saved profile when the user arrives at the user's home and may automatically change the hearing device states to the second saved profile when the user arrives at the user's office. In accordance with a technique of this disclosure, sound processing system 100 may verbally ask the user whether the user would like to sound processing system 100 to automatically change to particular saved profiles.

The following use cases illustrate examples of how the different components may work together as a system effectively. It should be recognized that the proposed techniques and their potential are not limited to these use cases.

One of the most frequent adjustments in daily environments by the user is volume control. For ease of explanation, this disclosure refers to this user as "Dean" and the unique word as "Starkey." Using the examples of FIG. 2 and FIG. 3, instead of adjusting a tiny volume control (especially when the user is occupied with other activities), the user talks to the hearing device(s) of sound processing system 100 using any of the following ways for example:

Dean: "Starkey, volume control up", or
Dean: "Starkey, reduce volume control", or
Dean: "Starkey, make it louder"

Due to the potentially limited capacity of speech recognition and natural language understanding components in the examples of FIG. 2 and FIG. 3, the user may need to speak to the hearing devices in a more constrained way and might not be able to be as natural as he/she normally would. Once the master hearing device understands what is being said, the master hearing device may query cognitive engine 116 (which may comprise business logic in the examples of FIG. 2 and FIG. 3) to find out the concrete action(s) to take: for example, increase or decrease volume control by a given amount based on current input spectrum, the user's hearing profile, the user's preference, the user's experience, the user's patterns, the current state of the hearing aid, etc. In addition, due to potentially limited capability of speech synthesis in the examples of FIG. 2 and FIG. 3, the hearing devices may provide a limited verbal feedback to let the user know the action(s) taken. The hearing devices adjust the volume control and play out the verbal feedback to the user. For example, Devices: "Dean, volume control increased" or
Devices: "Dean, volume control reduced"

Using the examples of FIG. 4 and FIG. 5, with a potentially full-power speech recognition algorithm and a natural language understanding algorithm, the user may be able to speak to the hearing devices as naturally as he/she normally would, and the hearing devices of sound processing system 100 can still understand the user intention. For example, the user can talk to the hearing devices naturally in any of, but not limited to, the following ways:

Dean: "Starkey, can you make my devices a little bit softer?" or
Dean: "Starkey, my devices are too quiet. can you make my devices much louder?" or
Dean: "Starkey, the environment is too loud. Can you help me?"

In the example of FIG. 4, cognitive engine 116 may generate a set of more effective actions and user feedback based on the natural language understanding output and what cognitive engine 116 learns from the current acoustic environment, geographic environment, the user's hearing profile, preference and experience and patterns, and/or other information. The potentially even more powerful cognitive engine in the example of FIG. 5 may also learn from what other hearing devices users do in a similar situation using crowdsourcing in addition to what the cognitive engine in the example of FIG. 4 does to generate even more effective actions and more personalized user feedback. In addition, with a full-power speech synthesis algorithm, the hearing devices of sound processing system 100 can provide a more friendly and personalized user feedback to let the user know the action(s) taken. The hearing devices adjust the volume control more effectively and play out the personalized verbal feedback to the user. For example, Devices: "Dean, I have reduced the volume control for you. Does it sound better?" or
Devices: "Dean, I have further increased volume control for you. Is it comfortable now?"

Many hearing devices users often encounter noisy situations where they are unhappy with the listening experience because simple volume control does not solve the problem and they do not know the algorithms well enough to make additional adjustments. In some examples, depending on how sound processing system 100 is configured, sound processing system 100 does or does not proactively prompt the user for adjustment.

Using the examples of FIG. 2 and FIG. 3 of this disclosure, the user may simply talk to the hearing devices using any of the following ways for example:

Dean: "Starkey, decrease noise", or
Dean: "Starkey, reduce noise", or
Dean: "Starkey, make speech clear"

Due to the potentially limited capacity of the natural language understanding in the examples of FIG. 2 and FIG. 3, the user may need to speak to the hearing devices in a more constrained way. Once the master hearing device understands what is said, the master hearing device queries cognitive engine 116 (e.g., which may comprise business logic in the examples of FIG. 2 and FIG. 3) to determine the concrete action to take. For example, cognitive engine 116 may make the determination to activate a single microphone noise reduction algorithm or adjust the maximum noise reduction based on the current acoustic or geographic environment, the user's hearing profile, preference and experience and patterns, etc. In addition, with potentially-limited speech synthesis capability, the hearing devices may provide verbal user feedback to let the user know the action(s) taken. The hearing devices may activate the noise reduction and play out the verbal feedback to the user for example, Devices: "Dean, Noise reduction activated" or Devices: "Dean, Noise reduction enabled"

If the user is still unhappy, the user may go through the following steps until he/she is happy:

Dean: "Starkey, reduce noise",

Devices: "Dean, more noise reduction prescribed" after increasing the maximum noise reduction on the hearing devices The implementations of sound processing system 100 in the examples of FIG. 4 and FIG. 5 may provide an even better experience to the user. With a potentially full-power speech recognition algorithm and natural language understanding algorithm, the user may be able to speak as naturally as he/she normally does and the hearing devices can still understand well. For example, the user can talk to the hearing devices naturally in any of, but not limited to, the following ways:

Dean: "Starkey, I can't understand anyone around me. Please help" or

Dean: "Starkey, the environment is too noisy. I can't understand my wife. Can you help me?" or Dean: "Starkey, my device is so noisy that I can't stand it"

Cognitive engine 118 in the example of FIG. 4 may generate a set of more effective actions and user feedback based on the natural language understanding output and what the cognitive engine learns from the current acoustic or geographic environment, the user's hearing profile, preference and experience and patterns, etc. The potentially even more powerful cognitive engine in the example of FIG. 5 may also learn from what other users do in a similar situation using crowdsourcing in addition to what the example of FIG. 4 does to generate even more effective actions and user feedback. In other words, cognitive engine 116 may be configured to learn to generate actions 120 and feedback 122 based in part on what other users do in situations similar to that of the user. For example, cognitive engine 116 may receive appropriately anonymized input vectors describing the situations of other users and may receive spoken content describing listening difficulties of the other users. In this example, cognitive engine 116 may train a neural network to generate actions similar to the actions that resolved the other user's listening difficulties when given the other user's input vectors. In this example, when cognitive engine 116 subsequently receives an input vector for the user of sound processing system 100 that is close to one or more of the input vectors of the other users, cognitive engine 116 may generate actions 120 that may be close to or the same as actions that resolve the other user's listening difficulties.

In addition, with a full-power speech synthesis algorithm, the hearing devices may provide more friendly and personalized user feedback to let the user know the actions taken. The hearing devices adjust the noise reduction settings more effectively and play out the personalized verbal feedback to the user for example, Devices: "Dean, I have activated the noise reduction for you. Does it sound better?" or Devices: "Dean, I have further increased the amount of noise reduction for you. Is it comfortable now?"

If the user is still unhappy, he/she may go through the following steps until he/she is happy:

Dean: "Starkey, my device is still noisy. Can you turn it down further?"

Devices: "Dean, yes, I have reduced it further. how does it sound now?"

The System may Prompt the User for Adjustment Proactively

Upon entering into this scenario, sound processing system 100 (or the hearing devices of sound processing system 100) may automatically estimate the signal-to-noise ratio and related noise reduction algorithm status. Then, sound processing system 100 determines a specific recommended action. For example, the action may be to activate a single microphone noise reduction algorithm or adjust a maximum noise reduction based on the current acoustic environment, the user's hearing profile, preference and experience and patterns, the current hearing device states, and/or other information. In some examples, sound processing system 100 prompts the user for a potential adjustment. In the examples of FIG. 2 and FIG. 3 of this disclosure, sound processing system 100 may prompt the user using any of the following ways for example:

Devices: "Dean, want to reduce noise?", or

Devices: "Dean, reduce more noise?"

Due to the potentially limited capacity of the natural language understanding in the examples of FIG. 2 and FIG. 3, the user may need to speak to the hearing devices in a more constrained way. For example, the user may respond using any of the following ways for example:

Dean: "Starkey, yes, please", or

Dean: "Starkey, go ahead", or

Dean: "Starkey, OK"

Once the master hearing device has determined what is said, with limited speech synthesis capability, the hearing devices may provide a verbal user feedback to let the user know the action(s) taken. For example, the hearing devices activate a noise reduction algorithm and play out the verbal feedback to the user for example, Devices: "Dean, Noise reduction activated" or Devices: "Dean, Noise reduction enabled"

If the user is still unhappy, he/she may go through the following steps until he/she is happy:

Dean: "Starkey, reduce noise",

Devices: "Dean, more noise reduction prescribed" after increasing the maximum noise reduction on the hearing devices In another example, if the user is still unhappy, the user may undo the previous adjustments:

Dean: "Starkey, undo adjustments."

Devices: "Dean, adjustments undone."

In the examples of FIG. 4 and FIG. 5, sound processing system 100 may provide a better experience to the user. For example, sound processing system 100 may prompt the user with the recommended action using any of the following ways:

Devices: "Dean, the environment is very noisy. Would you like me to turn on the noise reduction for you?", or Devices: "Dean, this place is too noisy. Do you like a little more noise reduction?"

With a potentially full-power speech recognition algorithm and natural language understanding algorithm, the user can speak as naturally as he/she normally does and the hearing devices can still understand well. For example, the user may respond to the system naturally in any of, but not limited to, the following ways:

Dean: "Starkey, Yes, please activate the noise reduction for me" or

Dean: "Starkey, Thank you. Give me some more noise reduction here?"

Sound processing system 100 performs the action and provides a more friendly and personalized user feedback to let the user know the actions taken. For example, Devices: "Dean, I have activated noise reduction for you. Does it sound better?" or Devices: "Dean, I have further increased the amount of noise reduction for you. Is it comfortable now?".

If the user is still unhappy, he/she may go through the following steps until he/she is happy:

Dean: "Starkey, my device is still noisy. Can you turn it down further?"

Devices: "Dean, yes, I have reduced it further. How does it sound now?"

Even More Complex Adjustment Scenario

For some hearing devices users, there are situations where they are still unhappy with the listening experience even after the hearing devices have made more complex adjustments as described in the previous section of this disclosure. In this case, techniques of this disclosure may provide a way to get a hearing professional, such as an audiologist, involved and troubleshoot the issue together with the user and the devices on the spot.

For example, the user still complains about how sharp the environment sound is even after the hearing devices have gone through the complex adjustment as described in the last section. Because the devices need to get the hearing professional (this disclosure refers to hearing professional as "Andrea") online automatically, the examples of FIG. 4 and FIG. 5 can provide that capability due to their ability to connect to the Internet. With the full power of speech recognition and natural language understanding in the example of FIG. 5 (and potentially the example of FIG. 4), the user can speak to both the hearing devices and the hearing professional in a natural way. For example, Dean: "Starkey, I still can't stand how sharp the ambient sound is"

Devices: "Dean, I am sorry, but I have tried everything I could. Are you ok if we conference your audiologist in?", Dean: "Starkey, yes, it is fine"

Devices: "Dean, let me call your audiologist, Andrea, for help. Please hold on", Devices tries and successfully connects with Andrea Devices: "Good morning Andrea"

Andrea: "Hello Dean and Starkey, what can I do for you"

Devices: "I have tried to help Dean with his sharpness issue with the devices but have been unsuccessful. You should have a summary of the troubleshooting in your inbox now. Can you help Dean"

Andrea: "Let me take a look and see what I can do"

Pause for 3 mins so Andrea can read the summary

Andrea: "Dean, I think I know where the problem is and have made an adjustment on your devices remotely. How does it sound now?"

Dean: "Hmm, it sounds better. Can you make a little more adjustment? It is still sharper than what I want"

Andrea makes additional adjustment

Andrea: "Absolutely, how does it sound now?"

Dean: "It sounds much better. Thank you so much"

Andrea: "I am more than happy to help. Anything else I can help you with, Dean?"

Dean: "That's it for now. Thank you again"

Devices: "Thank you, Andrea, so much for your expert help! I will learn from what you did so that we can give our customers much better experience next time"

Andrea: "You are both welcome"

As noted elsewhere in this disclosure, cognitive engine 116 may generate a set of more effective actions and user feedback based on the natural language understanding output and various other information, such as the user's current acoustic or geographic environment, the user's hearing profile, the user's preferences, the user's experiences, the user's patterns, and/or other information. Cognitive engine 116 may be implemented in various ways. For example, cognitive engine 116 may be implemented as one or more neural networks. For instance, in this example, a first neural network of cognitive engine 116 may determine actions 120 and a second neural network of cognitive engine 116 may determine feedback 122 based on actions 120 determined by the first neural network. In another example, a neural network of cognitive engine 116 may determine actions 120 and a set of business rules and may determine feedback 122 based on actions 120 determined by the neural network.

In some examples in which cognitive engine 116 includes a neural network to determine actions 120, cognitive engine 116 may train the neural network. For instance, the neural network may take various types of information as input (e.g., one or more of the current hearing device states of the user's hearing devices, information about the user's preferences, information about the user's experiences, information about the user's behavior patterns, information about the user's geographic location, and so on). The information that the neural network takes as input may include a vector of elements, which of which has a quantitative value.

Furthermore, in this example, the neural network may output actions 120. Actions 120 may indicate an updated hearing device state. For example, the neural network may output actions 120 indicating an updated full set of information in the hearing device state. In other examples, the neural network may output actions 120 indicating changes to the current hearing device state. In some examples, the neural network may generate an output vector of numerical elements. In this example, the elements of the output vector may correspond to different potential predefined actions.

Device adjustment blocks 128 may use actions 120 to update the current hearing device states of hearing devices of sound processing system 100 (e.g., hearing devices 200, 300, 302, 400, 402, 500, 502). If the user of sound processing system 100 finds the sound produced by the hearing devices based on the updated current hearing device states to be acceptable (e.g., by verbal acknowledgment, not requesting further adjustments, etc.) cognitive engine 116 may interpret this as positive reinforcement for further training the neural network. However, if the user of sound processing system 100 requests further adjustments, cognitive engine 116 may interpret this as negative reinforcement for further training the neural network.

In some examples, the neural network may be pretrained using data that is not specific to the user of sound processing system 100. For example, the neural network may be pretrained using data developed from users of other sound processing systems. Furthermore, the neural network may continue to be trained based on data developed from users of other sound processing systems. In other words, cognitive engine 116 may use the positive or negative reactions of other users to changes to the hearing device states of their hearing devices as examples for training the neural network of cognitive engine 116. In this way, crowdsourcing may be used to train the neural network of cognitive engine 116.

In some examples, users (e.g., the user of sound processing system 100) may provide a verbal indication of a degree to which the updates to the current hearing device states improved or worsened the user's opinion of the sound produced by the hearing devices of their sound processing systems. For example, the user's own voice signal may include words and phrasing indicating whether updates to the current hearing device states have greatly, moderately, or somewhat resolved or worsened the user's listening difficulty. Cognitive engine 116 may use the information regarding the degree to which the updates to the current hearing device states have improved or worsened the user's opinion of the sound produced by the hearing devices of their sound processing systems in training the neural network. For instance, cognitive engine 116 may penalize a set of actions more severely as the level of improvement decreases and the level of worsening increases. When training the neural network, cognitive engine 116 may make larger changes to parameters (e.g., weights) when the actions are more severely penalized.

In some examples, if actions 120 do not result in the hearing devices producing acceptable sound, sound processing system 100 may establish an audio connection to an audiologist, doctor, or other type of hearing professional. For instance, sound processing system 100 may conference in a hearing professional over an internet connection to resolve the listening difficulty of the user. The user and the healthcare professional may discuss the user's listening difficulty and the healthcare professional may remotely send actions to the user's hearing devices. If the actions sent by the healthcare professional resolve the user's listening difficulty, cognitive engine 116 may use the actions sent by the healthcare professional as training data to train the neural network of cognitive engine 116. For instance, cognitive engine 116 may run a cost function that evaluates errors between the actions generated by the neural network and the actions sent by the healthcare professional. In this example, cognitive engine 116 may then apply a backpropagation algorithm that updates parameters of the neural network based on the errors. In this way, cognitive engine 116 may learn from what a hearing professional (e.g., an audiologist, doctor, etc.) does to overcome or resolve the user's listening difficulty.

Automatic Translation of a Conversation Scenario

An audio system implemented in accordance with techniques of this disclosure can be configured to enable two persons from different languages to converse naturally. For example, when one person who does not understand German talks in English to the other person who speaks German, the proposed system takes the first talker's speech signal picked up and enhanced by his/her hearing device(s), recognizes and converts it into text using speech recognition and natural language understanding, automatically translates the text from English to German, generates a synthesized speech according to the second talker's preference, plays in to the second talker via the receiver on his/her hearing device(s). The same process applies when the second person talks and the first person listens. This realizes a true real-time conversation between two people who speak two different languages.

In accordance with techniques of this disclosure, sound processing system 100 may be natural and interactive. For example, the user may talk to the hearing devices in a natural way because we use speech recognition and natural language understanding to understand the user's intent. Furthermore, in some examples, speech enhancement is used to enhance the noisy microphone signal before speech recognition so that the user does not have to talk to your devices too loud. In some examples, a natural verbal feedback is always provided using speech synthesis. Furthermore, in some examples, a cognitive engine is used to generate an intelligent response and make it more interactive. In some examples, language translation is used to enable automatic voice-to-voice translation from one language to another. Additionally, sound processing system 100 may be efficient and may conserve battery power of hearing device because an activation trigger is used to activate speech recognition only when necessary to save battery power for the master hearing device. Furthermore, sound processing system 100 is intelligent. For example, cognitive engine 116 may generate a set of effective actions and personalized user feedback based on the natural language understanding output and what it learns from the current acoustic or geographic environment, current hearing device state (e.g., current hearing aid state), the user's hearing profile, preference and past experience and patterns, and/or other information. In addition, cognitive engine 116 may learn from what other users do in a similar situation using crowdsourcing. Cognitive engine 116 may also learn from what a hearing professional does to overcome the user's listening difficulty.

Sound processing system 100 of this disclosure may be effective at solving the user's listening difficulty on the spot. For example, when the user encounters listening difficulty in a real-life situation, the user can report the listening difficulty to sound processing system 100 in a way that seems natural and interactive to the user on the spot instead of having to wait to go to a clinic to troubleshoot and resolve the listening difficulty. Sound processing system 100 may be able to understand easily the difficulty, access and leverage the hearing device knowledge and expert experience and produce an effective solution based on the current acoustic or geographic environment, current hearing device state (e.g., current hearing aid state), the user's hearing profile, preference and experience and patterns and even what other users do in a similar situation using crowd-sourcing. If sound processing system 100 cannot not resolve the difficulty, it has the option to bring a hearing professional, such as an audiologist, online to resolve the difficulty together. The techniques of this disclosure can be used for not only hearing devices, but also for health monitor devices.

Figure 6:
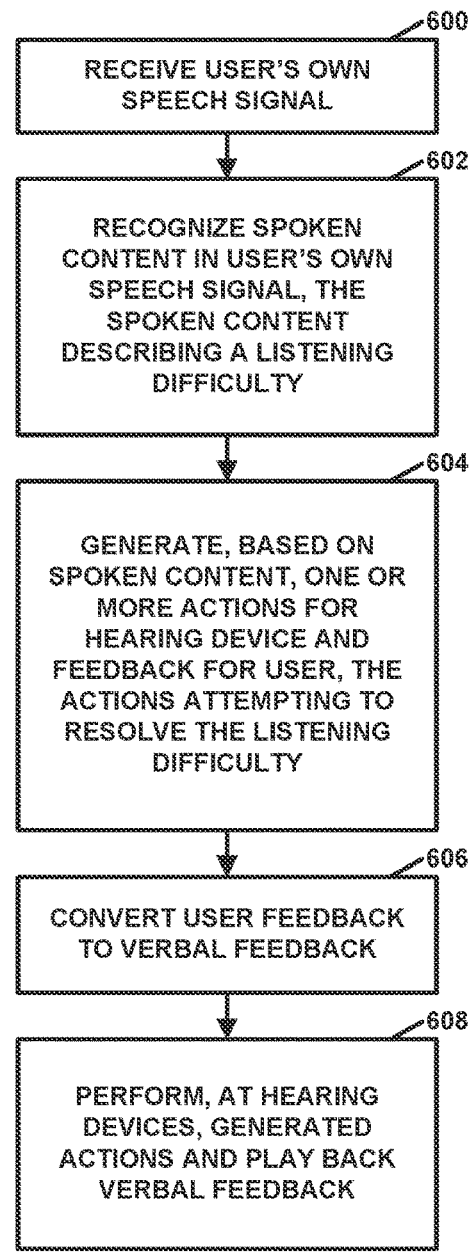
FIG. 6 is a flowchart illustrating an example operation of a sound processing system, in accordance with one or more aspects of this disclosure.

FIG. 6 is a flowchart illustrating an example operation of sound processing system 100, in accordance with one or more aspects of this disclosure. The flowchart of FIG. 6 is provided as an example. In other examples in accordance with the techniques of this disclosure, sound processing system 100 may perform operations that include more, fewer, or different actions, or may perform actions in different orders or in parallel.

In the example of FIG. 6, microphones 104 of sound processing system 100 receive the user's own speech signal (600). Additionally, in the example of FIG. 6, sound processing system 100 may recognize spoken content in the user's own speech signal using speech recognition and natural language understanding (602). For instance, in the example of FIG. 1, speech recognition block 112 and natural language understanding block 114 of sound processing system 100 may recognize the spoken content in the user's own speech signal as described elsewhere in this disclosure. In some examples, prior to recognizing the spoken content in the user's own speech signal, speech enhancement block 108 may enhance the user's own speech signal. For instance, in one example, one of the hearing devices of sound processing system 100 is a master hearing device and the master hearing device is configured to enhance the user's own speech signal and to reduce background noise and interference using the microphones from both the hearing devices. In this example, the master hearing device may be configured to enhance the user's own speech signal by beamforming all of the microphones, when applicable, on the hearing devices and followed by postfiltering. In some examples, the master hearing device may be configured to enhance the user's own speech signal by using a deep neural network-based multi-microphone speech enhancement algorithm.

The spoken content may describe a listening difficulty of the user. Such listening difficulties may be problems with users' hearing devices that prevent users from listening to sounds that the users want to listen to or problems with the users' hearing devices that cause the users' hearing devices to produce sounds that are undesirable to the users. Such listening difficulties may occur at various times. For example, the listening difficulty may occur during an initial fitting of the hearing devices. For instance, the hearing devices may initially have default hearing device states that are not tailored to the user. This may be the case when the user obtains the hearing devices over the counter. Thus, in this example, the user may use the interactive voice system of this disclosure as at least part of an initial fitting session, which may or may not be conducted in the presence of a hearing professional. Hence, in this example, the listening difficulty experienced by the user may be a problem, as experienced by the user, with the default hearing device states of the hearing devices. In other examples, listening difficulties may arise at later times, such as after an initial fitting session or after initial adjustments are made to the hearing device states. For instance, a listening difficulty may occur when the user enters a new acoustic environment. Thus, especially in the case of over the counter hearing devices where a thorough fitting session with a hearing professional is not conducted, the user may encounter listening difficulties and may use the voice control techniques of this disclosure iteratively to cause sound processing system 100 to make adjustments to the hearing devices as the listening difficulties arise.

In some examples, such as the example of FIG. 4, the user's own speech signal may be wirelessly transmitted to body-worn device 404 for further processing. In some examples, such as the example of FIG. 5, the user's own speech signal may be wirelessly transmitted to cloud-based computing system 506 (e.g., via body-worn device 504).

Additionally, in the example of FIG. 6, sound processing system 100 may generate, based on the spoken content, one or more actions 120 for the hearing devices and feedback 122 for the user (604). The one or more generated actions 120 attempt to resolve the listening difficulty by making adjustments to the hearing devices. Actions 120 may describe adjustments to the hearing device by adjusting relevant algorithms and parameters. For example, actions 120 may describe changes to the current hearing device states of the hearing devices of sound processing system 100. The hearing device states of the hearing devices contain may data that control how the hearing devices process incoming sound to produce sound produced by receivers 106. For example, the hearing device states may contain data specifying whether binaural noise reduction is enabled, data specifying a transform function, data specifying adjustments to one or more compressor parameters, and so on. In some examples, the transform function may specify how the incoming sound is transformed at individual frequency bands. As described elsewhere in this disclosure, cognitive engine 116 of sound processing system 100 may determine the actions and the feedback based on the spoken content and other input data, such as the current hearing device state, current geographic location, current acoustic environment, and so on. The feedback for the user may include text representing a response to the spoken content.

In some examples, cognitive engine 116 is configured to generate the one or more actions 120 and feedback 122 based on at least one of: the spoken content and what cognitive engine 116 learns from a current acoustic or geographic environment, a current hearing device state, a hearing profile of the user, preferences of the user, and experience and patterns. Additionally, in some examples, cognitive engine 116 may learn from what other users do in similar situations using crowdsourcing. In other words, cognitive engine 116 may be configured to learn to generate actions 120 and feedback 122 based in part on what other users do in situations similar to that of the user. In some examples, cognitive engine 116 may learn from what a hearing professional, such as an audiologist, does to overcome a listening difficulty of the user.

In some examples, the actions 120 determined by cognitive engine 116 may include changes that result in two or more alternative hearing device states. Feedback 122 may prompt the user to indicate whether the sound produced by receivers 106 is better when the hearing devices use either of the alternative hearing device states. In this way, A/B comparisons may be made when attempting to resolve the user's listening difficulties.

Sound processing system 100 may convert the feedback 122 to verbal feedback 126 using speech synthesis (606). For instance, speech synthesis block 124 may convert feedback 122 to verbal feedback 126 as described elsewhere in this disclosure. Furthermore, in the example of FIG. 6, the one or more hearing devices of sound processing system 100 may perform the generated actions 120 and play back verbal feedback 126 to the user using the receivers in a binaural way (608). For example, to perform actions 120, processing blocks 130 may update the hearing device states of the hearing devices. To play back verbal feedback 126, processing blocks 130 may convert verbal feedback 126 into audio signals usable by receivers 106 to output sound. Verbal feedback 126 may be played back in a binaural way in the sense that both of the hearing devices may play back verbal feedback 126.

In the example of FIG. 3, hearing device 300 may wirelessly transmit the generated actions 120 and verbal feedback 126 to hearing device 302. In the example of FIG. 4, body-worn device 404 may wirelessly transmit the generated actions 120 and verbal feedback 126 to hearing device 400 and hearing device 402. In the example of FIG. 5, cloud-based computing system 506 may wirelessly transmit, via body-worn device 504, generated actions 120 and verbal feedback 126 to hearing device 500 and hearing device 502.

The following paragraphs list examples in accordance with techniques of this disclosure.

Example 1A. A system comprises a non-implantable hearing device with at least one microphone, a processor, volatile and non-volatile storage and a receiver; the hearing device uses the microphone(s) to pick up the user's own speech signal, the hearing device recognizes the spoken content in the own speech signal using the speech signal using speech recognition and natural language understanding, the hearing device uses the recognized content as input to a cognitive engine to generate action(s) for the hearing device and feedback for the user, the hearing device performs the generated action(s), and the hearing device provides the feedback to the user using speech synthesis via the receiver.

Example 2A. The system of example 1A, wherein the system enhances the own speech signal and reduce background noise and interferences using some or all of the microphones.

Example 3A. The system of example 1A, wherein the system enhances the own speech signal by using a beamforming of all of the microphones when applicable and followed by a postfiltering.

Example 4A. The system of example 1A, wherein the system enhances the own speech signal by using a deep neural network-based multi-microphone speech enhancement algorithm.

Example 5A. The system of example 1A, wherein the system uses an activation trigger to activate the speech recognition only when necessary.

Example 6A. The system of example 1A, wherein the system uses a configurable unique name or phrase (e.g., for the hearing devices) followed by a phrase for the user to interact with the system.

Example 7A. The system of example 6A, wherein the system uses a unique multi-syllable word or phrase as the unique name or phrase to guard against unintended speech interpretation.

Example 8A. The system of example 1A, wherein the system first recognizes a unique name or phrase for the hearing device and then recognizes a phrase or sentence following the unique name or phrase.

Example 9A. The system of example 8A, wherein the system is trained using the user's own voice to reduce false alarms from other talkers.

Example 10A. The system of example 8A, wherein the system processes the recognized phrase using natural language understanding to derive an intent of the user.

Example 11A. The system of example 1A, wherein the system uses a set of business logic as the cognitive engine.

Example 12A. The system of example 11A, wherein the system relies on the business logic to generate a set of actions and user feedback based on at least one of: natural language understanding output and a current acoustic or geographic environment, current hearing device state (e.g., current hearing aid state), a hearing profile of the user, and preference and experience and patterns of the user.

Example 13A. The system of example 1A, wherein the system provides the feedback to the user using the speech synthesis based on preferences of the user.

Example 14A. The system of example 1A, wherein the system interacts with the user, understands and resolves a listening difficulty of the user in a real-life situation on the spot.

Example 15A. The system of example 14A, wherein the system produces a solution to the listening difficulty based on the hearing device's knowledge and expert experience and by analyzing at least one of: a current acoustic or geographic environment, a current hearing device state (e.g., a current hearing aid state), a hearing profile of the user, preferences of the user, and experience and patterns.

Example 1B. A system comprises of a pair of non-implantable or non-implantable hearing devices with at least one microphone, a processor, volatile and non-volatile storage and a receiver or electrodes on each hearing device, wherein: each hearing device uses the microphone(s) to pick up a user's own speech signal, one of the hearing devices is a master hearing device, the master hearing device recognizes the spoken content in the own speech signal using the speech signal using speech recognition and natural language understanding, the master hearing device uses the recognized content as input to a cognitive engine to generate action(s) for the hearing devices and feedback for the user, one or more of the hearing devices perform the generated action(s), and one or more of the hearing devices provide feedback to the user using speech synthesis via the receivers in a binaural way.

Example 2B. The system of example 1B, wherein the system relies on the master hearing device to enhance the own speech signal and reduce a background noise and interferences using the microphones from both of the hearing devices.

Example 3B. The system of example 1B, wherein the master hearing device enhances the own speech signal by using a beamforming of all of the microphones when applicable and followed by a postfiltering.

Example 4B. The system of example 1B, wherein the master hearing device enhances the own speech signal by using a deep neural network-based multi-microphone speech enhancement algorithm.

Example 5B. The system of example 1B, wherein the master hearing device uses an activation trigger to activate the speech recognition only when necessary.

Example 6B. The system of example 1B, wherein the system uses a configurable unique name or phrase (e.g., for the hearing devices) followed by a phrase for the user to interact with the system.

Example 7B. The system of example 6B, wherein the system uses a unique multi-syllable word or phrase as the unique name or phrase to guard against unintended speech interpretation.

Example 8B. The system of example 1B, wherein the master hearing device first recognizes a unique name or phrase for the system and then recognizes a following phrase.

Example 9B. The system of example 8B, wherein the system is trained using the user's own voice to further reduce false alarms from other talkers.

Example 10B. The system of example 1B, wherein the master hearing device processes the recognized phrases using the natural language understanding to derive an intent of the user.

Example 11B. The system of example 1B, wherein the system performs the action(s) based on the recognized command.

Example 12B. The system of example 1B, wherein the system uses a set of business logic as the cognitive engine.

Example 13B. The system of example 12B, wherein the system relies on the business logic to generate the actions and the feedback based on at least one of: the natural language understanding output and a current acoustic or geographic environment, a current hearing device state (e.g., a current hearing aid state), a hearing profile of the user, preferences of the user, and experience and patterns.

Example 14B. The system of example 1B, wherein the system provides the feedback to the user using the speech synthesis based on preferences of the user.

Example 15B. The system of example 1B, wherein the system interacts with the user, understands and resolves a listening difficulty of the user in real-life situation on the spot.

Example 16B. The system of example 15B, wherein the system produces a solution to the listening difficulty by accessing and leveraging the hearing device knowledge and expert experience and by analyzing at least one of: a current acoustic or geographic environment, a current hearing device state (e.g., a current hearing aid state), a hearing profile of the user, preferences of the user, experience, and patterns.

Example 1C. A system comprises of a pair of non-implantable or non-implantable hearing devices and a body-worn device, wherein: the body-worn device comprises a processor, volatile and non-volatile storage, and is configured to communicate with both of the hearing devices wirelessly, each of the hearing devices has at least one microphone, a processor, volatile and non-volatile storage, and a receiver or electrodes, each hearing device uses its microphone(s) to pick up a user's own speech signal, one or more of the hearing devices transmit the user's own speech signal to the body-worn device wirelessly, the body-worn device recognizes spoken content in the own speech signal using speech recognition and natural language understanding, the body-worn device provides the spoken content to a cognitive engine to generate one or more action(s) for the hearing devices and feedback for the user, the body-worn device converts the user feedback to verbal feedback using speech synthesis, the body-worn device transmits the generated actions and the verbal feedback to each of the hearing devices, and both hearing devices perform the generated actions and play back the verbal feedback to the user using the receivers in a binaural way.

Example 2C. The system of example 1C, wherein one of the hearing devices is a master hearing device, and the master hearing device is configured to enhance the own speech signal and reduce background noise and interferences using the microphones of both of the hearing devices.

Example 3C. The system of example 1C, wherein one of the hearing devices is a master hearing device, and the master hearing device is configured to enhance the own speech signal by using a beamforming of all of the microphones, when applicable, on the hearing devices and followed by a postfiltering.

Example 4C. The system of example 1C, wherein one of the hearing devices is a master hearing device, and the master hearing device is configured to enhance the own speech signal by using a deep neural network-based multi-microphone speech enhancement algorithm.

Example 5C. The system of example 4C, wherein the master hearing device sends the enhanced speech to the body-worn device wirelessly.

Example 6C. The system of example 1C, wherein one of the hearing devices is a master hearing device, and the master hearing device is configured to use an activation trigger to activate speech recognition only when necessary.

Example 7C. The system of example 1C, wherein the body-worn device is a smartphone.

Example 8C. The system of example 1C, wherein the body-worn device is a smartwatch.

Example 9C. The system of example 1C, wherein the body-worn device is a personal assistant device.

Example 10C. The system of example 1C, wherein the system uses a configurable unique name or phrase (e.g., for the hearing devices) followed by one or more sentences for the user to interact with the system.

Example 11C. The system of example 10C, wherein the system uses a unique multi-syllable word or phrase as the unique name or phrase to guard against unintended speech interpretation.

Example 12C. The system of example 1C, wherein the body-worn device is configured to first recognizes a unique name or phrase for the device and then recognize one or more sentences following the unique name or phrase.

Example 13C. The system of example 12C, wherein the system is trained using the user's own voice to further reduce false alarms from other talkers.

Example 14C. The system of example 1C, wherein the cognitive engine is configured to generate the set of actions and the feedback based on at least one of: the natural language understanding output and what the cognitive engine learns from a current acoustic or geographic environment, a current hearing device state (e.g., a current hearing aid state), a hearing profile of the user, preferences of the user, and experience and patterns.

Example 15C. The system of example 1C, wherein the body-worn device is configured to translate the feedback from one language to another according to a preference of the user.

Example 16C. The system of example 1C, wherein the body-worn device is configured to convert, using the speech synthesis, the feedback into the verbal feedback based on the user's preference in a user database.

Example 17C. The system of example 1C, wherein the hearing devices provide the verbal feedback to the user in a binaural way.

Example 18C. The system of example 1C, wherein the system interacts with the user, understands and resolves a listening difficulty of the user in a real-life situation on the spot.

Example 19C. The system of example 18C, wherein the system produces a solution to the listening difficulty by accessing and leveraging hearing device knowledge and expert experience and by analyzing at least one of: a current acoustic or geographic environment, a current hearing device state (e.g., a current hearing aid state), a hearing profile of the user, preferences of the user, and experience and patterns.

Example 20C. The system of example 1C, wherein the system is configured to enable a first person and a second person to converse using two different languages.

Example 21C. The system of example 20C, wherein, for the first person, the system picks up speech of the second person, enhances, recognizes, converts the speech of the second person into text, translates the text from a language of the second person into a language of the first person, synthesizes the translated text according to a preference of the first person, and plays the synthesized translated text out to the first talker in a binaural way.

Example 22C. The system of example 21C, wherein, for the second person, the system picks up speech of the first person, enhances, recognizes, converts the speech of the first person into text, translates the text from the language of the first person into the language of the second person, synthesizes the translated text of the speech of the first person according to a preference of the second person and plays the synthesized translated text of the speech of the first person out to the second person (e.g., in a binaural way).

Example 1D. A system comprises of a pair of non-implantable or implantable hearing devices, a body-worn device and a cloud-based computing system, wherein: the cloud-based computing system comprises a processor, volatile and non-volatile storage, and is configured to connect with multiple body-worn devices wirelessly at the same time, the body-worn device comprises a processor, volatile and non-volatile storage, is configured to connect to either or both of the hearing devices wirelessly and is configured to connect with the cloud-based computing system wirelessly, each of the hearing devices has at least one microphone, a processor, volatile and non-volatile storage, and a receiver or electrodes, each of the hearing devices is configured to use its microphone(s) to pick up a user's own speech signal, the body-worn device is configured to wirelessly receive the user's own speech signal from one or more of the hearing device and to wirelessly transmit the user's own speech signal to the cloud-based computing system, the cloud-based computing system is configured to recognize spoken content in the own speech signal using speech recognition and natural language understanding, the cloud-based computing system is configured to provide the spoken content to a cognitive engine to generate action(s) for the hearing devices and feedback for the user, the cloud-based computing system is configured to convert the user feedback to verbal feedback using speech synthesis, the cloud-based computing system is configured to transmit the generated actions and the verbal feedback to one or more of the hearing devices via the body-worn device, and both of the hearing devices are configured to perform the generated actions and play back the verbal feedback to the user using the receivers in a binaural way.

Example 2D. The system of example 1D, wherein one of the hearing devices is a master hearing device, and the master hearing device is configured to enhance the own speech signal and to reduce background noise and interferences using the microphones from both the hearing devices.

Example 3D. The system of example 1D, wherein one of the hearing devices is a master hearing device, and the master hearing device is configured to enhance the own speech signal by using a beamforming of all of the microphones, when applicable, on the hearing devices and followed by a postfiltering.

Example 4D. The system of example 1D, wherein one of the hearing devices is a master hearing device, and the master hearing device is configured to enhance the own speech signal by using a deep neural network-based multi-microphone speech enhancement algorithm.

Example 5D. The system of example 4D, wherein the master hearing device sends the enhanced speech to the cloud-based computing system via the body-worn device wirelessly.

Example 6D. The system of example 1D, wherein one of the hearing devices is a master hearing device, and the master hearing device is configured to use an activation trigger to activate speech recognition only when necessary.

Example 7D. The system of example 1D, wherein the body-worn device is a smartphone.

Example 8D. The system of example 1D, wherein the body-worn device is a smartwatch.

Example 9D. The system of example 1D, wherein the body-worn device is a personal assistant device.

Example 10D. The system of example 1D, wherein the system uses a configurable unique name or phrase (e.g., for the hearing devices) followed by one or more sentences for the user to interact with the system.

Example 11D. The system of example 10D, wherein the system uses a unique multi-syllable word or phrase as the unique name or phrase to guard against unintended speech interpretation.

Example 12D. The system of example 1D, wherein the cloud-based computing system is configured to first recognizes a unique name or phrase and then recognize one or more sentence(s) following the unique name or phrase.

Example 13D. The system of example 12D, wherein the system is trained using the user's own voice to further reduce false alarms from other talkers.

Example 14D. The system of example 1D, wherein the cloud-based computing system is configured to translate the user feedback from one language to another according to a preference of the user.

Example 15D. The system of example 1D, wherein: the cognitive engine is configured to generate the actions and the user feedback based on at least one of: the natural language understanding output and what the cognitive engine learns from a current acoustic or geographic environment, a current hearing device state (e.g., a current hearing aid state), a hearing profile of the user, preferences of the user, and experience and patterns, the cognitive engine learns from what other users do in similar situations using crowd-sourcing, and the cognitive engine learns from what a hearing professional, such as an audiologist, does to overcome a listening difficulty of the user.

Example 16D. The system of example 1D, wherein the cloud-based computing system is configured to convert, using the speech synthesis, the user feedback into the verbal feedback based on a preference of the user in the user database.

Example 17D. The system of example 16D, wherein the hearing devices are configured to provide the verbal feedback to the user in a binaural way.

Example 18D. The system of example 1D, wherein the system interacts with the user, understands and resolves a listening difficulty of the user in a real-life situation on the spot.

Example 19D. The system of example 18D, wherein the system produces a solution to the listening difficulty by accessing and leveraging hearing device knowledge and expert experience and by analyzing at least one of: a current acoustic or geographic environment, a current hearing device state (e.g., a current hearing aid state), hearing profile of the user, a preference of the user and experience and patterns, and what other users have done in a similar situation using crowd-sourcing.

Example 20D. The system of example 18D, wherein the system conferences in a hearing professional (e.g., an audiologist or a doctor) over an internet connection to resolve the listening difficulty of the user.

Example 21D. The system of example 1D, wherein the system is configured to enable a first person and a second person to converse using two different languages.

Example 22D. The system of example 21D, wherein, for the first person, the system picks up speech of the second person, enhances, recognizes, converts the speech of the second person into text, translates the text from a language of the second person into a language of the first person, synthesizes the translated text according to a preference of the first person, and plays the synthesized translated text out to the first talker in a binaural way.

Example 23D. The system of example 22D, wherein, for the second person, the system picks up speech of the first person, enhances, recognizes, converts the speech of the first person into text, translates the text from the language of the first person into the language of the second person, synthesizes the translated text of the speech of the first person according to a preference of the second person and plays the synthesized translated text of the speech of the first person out to the second person (e.g., in a binaural way).

Techniques of this disclosure may be directed to individual devices (or combinations thereof) within the systems described in the examples above.

Figure 7:
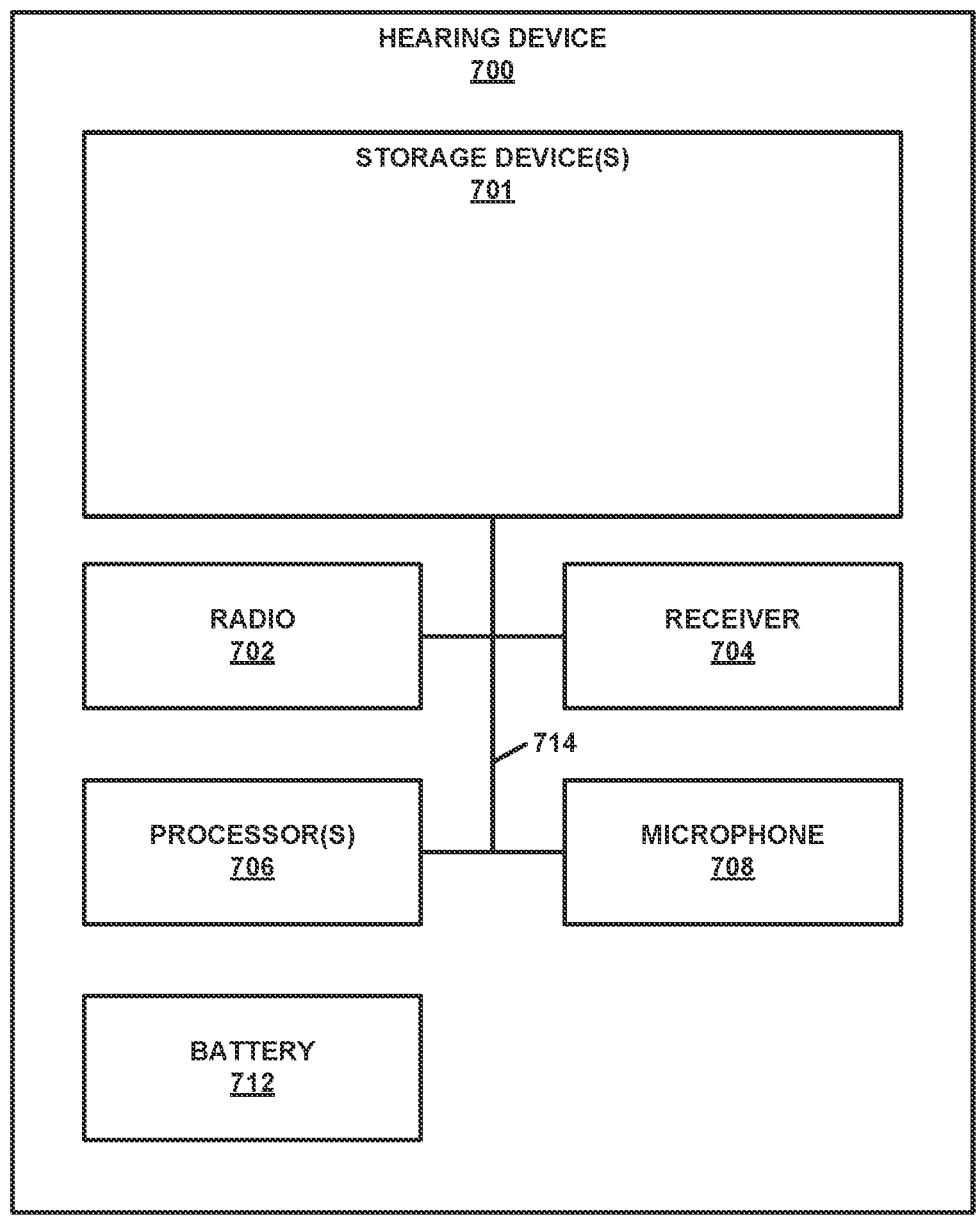
FIG. 7 is a block diagram illustrating example components of a hearing device, in accordance with one or more aspects of this disclosure.

FIG. 7 is a block diagram illustrating example components of hearing device 700, in accordance with one or more aspects of this disclosure. Sound processing system 100 (e.g., as shown in FIG. 1, FIG. 2, FIG. 3, FIG. 4, and FIG. 5) may include hearing device 700. In the example of FIG. 7, hearing device 700 comprises one or more storage device(s) 701, a radio 702, a receiver 704, one or more processor(s) 706, a microphone 708, a battery 712, and one or more communication channels 714. In some examples where hearing device 700 is an implantable hearing device, hearing device 700 may include one or more electrodes instead of receiver 704. Communication channels 714 provide communication between storage device(s) 701, radio 702, receiver 704, processor(s) 706, and a microphone 708. Components 701, 702, 704, 706, and 708 may draw electrical power from battery 712. In other examples, hearing device 700 may include more, fewer, or different components.

Storage device(s) 701 may store data. Storage device(s) 701 may comprise volatile memory and may therefore not retain stored contents if powered off. Examples of volatile memories may include random access memories (RAM), dynamic random access memories (DRAM), static random access memories (SRAM), and other forms of volatile memories known in the art. Storage device(s) 701 may further be configured for long-term storage of information as non-volatile memory space and retain information after power on/off cycles. Examples of non-volatile memory configurations may include flash memories, or forms of electrically programmable memories (EPROM) or electrically erasable and programmable (EEPROM) memories.

Radio 702 may enable hearing device 700 to send data to and receive data from one or more other computing devices. For example, radio 702 may enable hearing device 700 to send data to and receive data from other devices of sound processing system 100. Radio 702 may use various types of wireless technology to communicate. For instance, radio 702 may use Bluetooth, 3G, 4G, 4G LTE, ZigBee, WiFi, Near-Field Magnetic Induction (NFMI), or another communication technology.

Receiver 704 comprises one or more speakers for generating audible sound. Microphone 708 detects incoming sound and generates an electrical signal (e.g., an analog or digital electrical signal) representing the incoming sound. Processor(s) 706 may process the signal generated by microphone 708 to enhance, amplify, or cancel-out particular channels within the incoming sound. Processor(s) 706 may then cause receiver 704 to generate sound based on the processed signal. Furthermore, processor(s) 706 may implement the techniques of this disclosure for estimating a direction and/or locus of a user's auditory attention. In some examples, processor(s) 706 include one or more microprocessors, digital signal processors (DSPs), or other types of processing circuits.

In some examples, hearing device 700 comprises a custom earmold or a standard receiver module at the end of a RIC cable. The additional volume in a custom earmold may allow room for components such as sensors (accelerometers, heartrate monitors, temp sensors), a woofer-tweeter, (providing richer sound for music aficionados), and an acoustic valve that provides occlusion when desired. In some examples, a six conductor RIC cable is used for in hearing devices with sensors, woofer-tweeters, and/or acoustic valves.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processing circuits to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Functionality described in this disclosure, such as one or more processors, e.g., processors 706, may be performed by fixed function and/or programmable processing circuitry or processing circuits. For instance, instructions may be executed by fixed function and/or programmable processing circuitry. Such processing circuitry may include one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more electrical circuits or logic elements. Processing circuits may be coupled to other components in various ways. For example, a processing circuit may be coupled to other components via an internal device interconnect, a wired or wireless network connection, or another communication medium.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

In this disclosure, ordinal terms such as "first," "second," "third," and so on, are not necessarily indicators of positions within an order, but rather may simply be used to distinguish different instances of the same thing. Examples provided in this disclosure may be used together, separately, or in various combinations.

Various examples have been described. These and other examples are within the scope of the following claims.

What is claimed is:

1. A sound processing system comprising:
   a set of one or more hearing devices, wherein:
      each of the hearing devices comprises at least one microphone and a receiver, and
      for at least one hearing device of the set of hearing devices, the hearing device is configured to use the at least one microphone of the hearing device to detect an own speech signal of a user; and
   one or more processing circuits configured to:
      recognize spoken content in the own speech signal of the user using speech recognition and natural language understanding, the spoken content describing a listening difficulty of the user;
      generate, based on the spoken content describing the listening difficulty of the user, one or more actions for the hearing devices and feedback for the user, wherein the one or more actions attempt to resolve the listening difficulty by making adjustments to hearing device states of one or more of the hearing devices and the feedback is responsive to the spoken content describing the listening difficulty of the user;
      convert the feedback to verbal feedback using speech synthesis, wherein the hearing devices are configured to perform the one or more actions and play back the verbal feedback to the user using the receivers,
      ask the user whether to conference in a hearing professional in response to receiving an indication from the user that the one or more actions were unsuccessful in resolving the listening difficulty of the user;
      in response to an indication from the user to conference in the hearing professional, conference in the hearing professional over a network connection to resolve the listening difficulty; and
      learn from what the hearing professional does to resolve the listening difficulty.

2. The sound processing system of claim 1, wherein the one or more processing circuits are further configured to learn to generate the one or more actions based in part on what other users do in situations similar to that of the user.

3. The sound processing system of claim 1, wherein one of the hearing devices is a master hearing device, and the master hearing device is configured to enhance the own speech signal of the user and to reduce background noise and interference using microphones from both the hearing devices.

4. The sound processing system of claim 1, wherein one of the hearing devices is a master hearing device, and the master hearing device is configured to enhance the own speech signal of the user by beamforming all microphones on the hearing devices followed by postfiltering.

5. The sound processing system of claim 1, wherein the processing circuits are included in one or more of a body-worn device, a cloud-based computing system, or one or more of the hearing devices.

6. The sound processing system of claim 1, wherein the one or more actions include one or more of:
   activation of binaural noise reduction, or
   adjusting one or more compressor parameters.

7. The sound processing system of claim 1, wherein the one or more processing circuits are further configured to:
   receive a name for the hearing device states from the user;
   associate the hearing device states with the name;
   receive a spoken request from the user to change current hearing device states to the hearing device states associated with the name; and
   in response to the spoken request, change the current hearing devices states to the hearing device states associated with the name.

8. A method for making adjustments to hearing devices of a sound processing system, the method comprising:
   receiving, by one or more processing circuits, an own speech signal of a user, wherein the own speech signal of the user is detected by at least one microphone of the hearing devices;
   recognizing, by the one or more processing circuits, spoken content in the own speech signal of the user using speech recognition and natural language understanding, the spoken content describing a listening difficulty of the user;
   generating, by the one or more processing circuits, based on the spoken content describing the listening difficulty of the user, one or more actions for the hearing devices and feedback for the user, wherein the one or more actions attempt to resolve the listening difficulty by making adjustments to hearing device states of one or more of the hearing devices and the feedback is responsive to the spoken content describing the listening difficulty of the user;
   converting, by the one or more processing circuits, the feedback to verbal feedback using speech synthesis;
   asking, by the one or more processing circuits, the user whether to conference in a hearing professional in response to receiving an indication from the user that the one or more actions were unsuccessful in resolving the listening difficulty of the user;
   in response to an indication from the user to conference in the hearing professional, conferencing in, by the one or more processing circuits, the hearing professional over a network connection to resolve the listening difficulty; and
   learning, by the one or more processing circuits, from what the hearing professional does to resolve the listening difficulty.

9. The method of claim 8, further comprising learning, by the one or more processing circuits, to generate the one or more actions based in part on what other users do in situations similar to that of the user.

10. The method of claim 8, wherein the one or more actions include one or more of:
- activation of binaural noise reduction, or
- adjusting one or more compressor parameters.

11. The method of claim 8, further comprising:
- receiving a name for the hearing device states from the user;
- associating the hearing device states with the name;
- receiving a spoken request from the user to change current hearing device states to the hearing device states associated with the name; and
- in response to the spoken request, changing the current hearing devices states to the hearing device states associated with the name.

12. The method of claim 8, wherein the processing circuits are included in one or more of a body-worn device, a cloud-based computing system, or one or more of the hearing devices.

13. The method of claim 8, wherein one of the hearing devices is a master hearing device, and the master hearing device is configured to enhance the own speech signal and to reduce background noise and interference using microphones from both the hearing devices.

14. The method of claim 8, wherein one of the hearing devices is a master hearing device, and the master hearing device is configured to enhance the own speech signal of the user by beamforming of all microphones of the hearing devices followed by postfiltering.

15. A non-transitory computer-readable data storage medium having instructions thereon that, when executed by one or more processing circuits, cause a sound processing system to:
- receive an own speech signal of a user, wherein the own speech signal of the user is detected by at least one microphone of a set of one or more hearing devices;
- recognize spoken content in the own speech signal of the user using speech recognition and natural language understanding, the spoken content describing a listening difficulty of the user;
- generate, based on the spoken content describing the listening difficulty of the user, one or more actions for the hearing devices and feedback for the user, wherein the one or more actions attempt to resolve the listening difficulty by making adjustments to hearing device states of one or more of the hearing devices and the feedback is responsive to the spoken content describing the listening difficulty of the user;
- convert the feedback to verbal feedback using speech synthesis;
- ask the user whether to conference in a hearing professional in response to receiving an indication from the user that the one or more actions were unsuccessful in resolving the listening difficulty of the user;
- in response to an indication from the user to conference in the hearing professional, conference in the hearing professional over a network connection to resolve the listening difficulty; and
- learn from what the hearing professional does to resolve the listening difficulty.

16. The non-transitory computer-readable data storage medium of claim 15, wherein execution of the instructions further causes the sound processing system to learn to generate the one or more actions based in part on what other users do in situations similar to that of the user.

* * * * *